US012597000B2

(12) United States Patent
Anderson et al.

(10) Patent No.: US 12,597,000 B2
(45) Date of Patent: Apr. 7, 2026

(54) STABLECOIN AS A MEDIUM OF EXCHANGE ON A BLOCKCHAIN-BASED TRANSACTION NETWORK

(71) Applicant: Ceres Coin LLC, Austin, TX (US)

(72) Inventors: John Gregory Anderson, Austin, TX (US); Charles Henry Uchill, St. Charles, IL (US); Sean McNamara, Chicago, IL (US)

(73) Assignee: Ceres Coin LLC, Austin, TX (US)

( * ) Notice: Subject to any disclaimer, the term of this patent is extended or adjusted under 35 U.S.C. 154(b) by 0 days.

(21) Appl. No.: 18/943,183

(22) Filed: Nov. 11, 2024

(65) Prior Publication Data

US 2025/0069047 A1 Feb. 27, 2025

Related U.S. Application Data

(63) Continuation of application No. 18/367,617, filed on Sep. 13, 2023, now Pat. No. 12,141,769, which is a
(Continued)

(51) Int. Cl.
*G06Q 20/06* (2012.01)
*G06Q 20/02* (2012.01)
(Continued)

(52) U.S. Cl.
CPC ....... *G06Q 20/0655* (2013.01); *G06Q 20/381* (2013.01); *G06Q 20/382* (2013.01);
(Continued)

(58) Field of Classification Search
CPC ............. G06Q 20/0655; G06Q 20/381; G06Q 20/382; G06Q 20/401; G06Q 20/02; G06Q 20/06; G06Q 30/018; G06Q 2220/00
(Continued)

(56) References Cited

U.S. PATENT DOCUMENTS 10,621,560 B1    4/2020   Rickert
11,522,700 B1    12/2022  Auerbach et al.
(Continued)

FOREIGN PATENT DOCUMENTS

WO        2019157267 A1     8/2019
WO        2019173917 A1     9/2019
(Continued)

OTHER PUBLICATIONS

Dowsett "What are Stablecoins?", https://builtin.com/cryptocurrency/stablecoins, 14 pages, Feb. 3, 2023 (Year: 2023).*
(Continued)

*Primary Examiner* — James D Nigh

(74) *Attorney, Agent, or Firm* — Bochner PLLC; Matthew J. May

(57) ABSTRACT

Aspects of this disclosure relate to various systems and methods for use in a regulated industry and using an SEC qualified stablecoin as a store of value and medium of exchange on a blockchain-based transaction network. The system includes a stablecoin blockchain system with a stablecoin blockchain framework, a stablecoin ecosystem, and a stablecoin blockchain transaction network. The stablecoin blockchain system facilitates transactions between stablecoin blockchain participants within the stablecoin ecosystem. The stablecoin ecosystem conducts transactions across a stablecoin blockchain transaction network and a distributed blockchain ledger.

20 Claims, 11 Drawing Sheets

Related U.S. Application Data continuation of application No. 17/366,853, filed on Jul. 2, 2021, now Pat. No. 11,797,955, which is a continuation of application No. 17/098,687, filed on Nov. 16, 2020, now Pat. No. 11,055,677, which is a continuation of application No. 17/098,308, filed on Nov. 13, 2020, now abandoned.

(60) Provisional application No. 62/934,929, filed on Nov. 13, 2019.

(51) Int. Cl.
G06Q 20/38 (2012.01)
G06Q 20/40 (2012.01)
G06Q 30/018 (2023.01)

(52) U.S. Cl.
CPC ......... G06Q 20/401 (2013.01); G06Q 30/018 (2013.01); G06Q 2220/00 (2013.01)

(58) Field of Classification Search
USPC ........................................................ 705/64
See application file for complete search history.

(56) References Cited

U.S. PATENT DOCUMENTS

| | | | | |
|---|---|---|---|---|
| 2013/0297943 | A1 | 11/2013 | Hackler et al. | |
| 2017/0286965 | A1 | 10/2017 | Erwin et al. | |
| 2018/0096175 | A1 | 4/2018 | Schmeling et al. | |
| 2019/0195852 | A1 | 6/2019 | Bryant, Jr. et al. | |
| 2019/0340685 | A1* | 11/2019 | Wade ................. | G06Q 20/4014 |
| 2019/0386969 | A1 | 12/2019 | Verzun et al. | |
| 2020/0042989 | A1 | 2/2020 | Ramadoss et al. | |
| 2020/0184555 | A1* | 6/2020 | Gleizer ................. | H04L 9/3247 |
| 2020/0201910 | A1 | 6/2020 | Gavaudan et al. | |
| 2020/0213291 | A1 | 7/2020 | Cage et al. | |
| 2020/0273578 | A1 | 8/2020 | Kutzko et al. | |
| 2020/0279632 | A1 | 9/2020 | Mercolino et al. | |
| 2020/0286170 | A1 | 9/2020 | Kramer et al. | |
| 2020/0380476 | A1 | 12/2020 | Trudeau et al. | |
| 2020/0387891 | A1 | 12/2020 | Paschini et al. | |
| 2021/0142876 | A1 | 5/2021 | Cooray et al. | |
| 2021/0271877 | A1 | 9/2021 | Tran et al. | |

FOREIGN PATENT DOCUMENTS

| | | |
|---|---|---|
| WO | 2020010159 A1 | 1/2020 |
| WO | 2020028955 A1 | 2/2020 |
| WO | 2020102669 A1 | 5/2020 |

OTHER PUBLICATIONS

SEC FinHub Staff "SEC FinHub Staff Statement on OCC Interpretation", Sep. 21, 2020, 2 pages (Year: 2020).*
Gottheimer "Release: Gottheimer Announces "Stablecoin Innovation and Protection Act," Critical New Cryptocurrency Legislation", Feb. 15, 2022, 5 pages (Year: 2022).*
Pernice et al. "Monetary Stabilization in CryptoCurrencies—Design Approaches and Open Questions", arXiv:1905.11905v1, May 28, 2019, 13 pages (Year: 2019).*

PYMNTS "A Primer on US Stablecoin Regulations", retrieved from https://www.pymnts.com/cryptocurrency/2022/a-primer-on-us-stablecoin-regulations/, Aug. 23, 2022, 11 pages (Year: 2022).*
Central Bank Digital Currency, Jan. 8, 2020, 47 pages (Year: 2020).*
H.R. 6321, U.S. House of Representatives, Mar. 23, 2020, 270 pages (Year: 2020).*
Hockett "Money's Past is Fintech's Future: Wildcat Crypto, the Digital Dollar, and Citizen Central Banking", Stanford Journal of Blockchain Law and Policy, vol. 2.2., Oct. 1, 2019, pp. 221-231 (Year: 2019).*
Multichain Ventures, "Blockchain Visibility & Payment Solutions for the Cannabis Industry," visited on Oct. 8, 2020 at https://tokesplatform.org/.
Coolmellon, "Ceres Coin Financial Infrastructure for the Legal Cannabis Industry," visited on Oct. 8, 2020 at https://www.cerescoin.io/.
Jessica McKeil, "Blockchain For Global Supply Chain Management of Cannabis," visited on Oct. 8, 2020 at https://www.cannabistech.com/articles/blockchain-for-global-supply-chain-management-of-cannabis/.
bitcanna.io, "Bitcanna WhitePaper v 1.2," visited on Oct. 8, 2020 at https://www.bitcanna.io/.
The Hempcoin, "HempTRAC Agricultural Data Tracking Service," viisted Oct. 8, 2020 at https://hempcoin.org/hemptrac-thc.html.
Vocus PRW Holdings, LLC, "Nezly Takes Cannabis to the Stellar Blockchain," visited on Oct. 8, 2020 at https://www.prweb.com/releases/2018/02/prweb15211754.htm.
Bjoern Holste, "Weed on the Chain Can the German Cannabis Supply," visited on Oct. 8, 2020 at https://www.researchgate.net/publication/332283257_Weed_on_the_Chain_Can_the_German_Cannabis_Supply_Chain_Benefit_from_Blockchain_Technology.
FINRA Staff, "Cryptocurrencies: 3 Things to Know About Stablecoins", Apr. 17, 2020, 2 pages (Year: 2020).
Office of the Comptroller of the Currency, Interpretive Letter #1172, "OCC Chief Counsel's Interpretation on National Bank and Federal Savings Association Authority to Hold Stablecoin Reserves", Sep. 21, 2020, 6 pages (Year: 2020).
President's Working Group on Financial Markets Statement on Key Regulatory and Supervisory Issues Relevant to Certain Stablecoins, Dec. 23, 2020, 4 pages (Year: 2020).
SEC Division of Corporation Finance, Division of Investment Management, and Division of Trading and Markets, "Statement on Digital Asset Securities Issuance and Trading", Nov. 16, 2018, 6 pages (Year: 2018).
CERES Coin, LLC, Notice of Qualification, United States Securities and Exchange Commission, Washington, D.C., CIK: 0001734118, File No. 024-11256, Mar. 29, 2021 at <https://www.sec.gov/edgar/browse/?CIK=0001734118>.
CERES Coin, LLC, SEC Edgar Listing at <https://www.sec.gov/edgar/browse/?CIK=1734118>.
CERES Coin, LLC, Regulation A Offering Statement, 1-A/A (Amendment No. 5), United States Securities and Exchange Commission, Washington, D.C., CIK: 0001734118, File Name: g322101aa5, Mar. 3, 2021.
Commissioner Hester M. Peirce, Concurrence in the Matter of Wireline, Inc., Jan. 15, 2021.
"ICOx Innovations Announces FreedomCoin—A Utility Token for the GunBroker.com Marketplace," filed as Ex. 99.1 2 ex99-1.htm, retrieved from <https://www.sec.gov/Archives/edgar/data/0001515139/000149315219001062/ex99-1.htm>, Jan. 9, 2019, 4 pages (Year: 2019).

* cited by examiner

Figure 1:
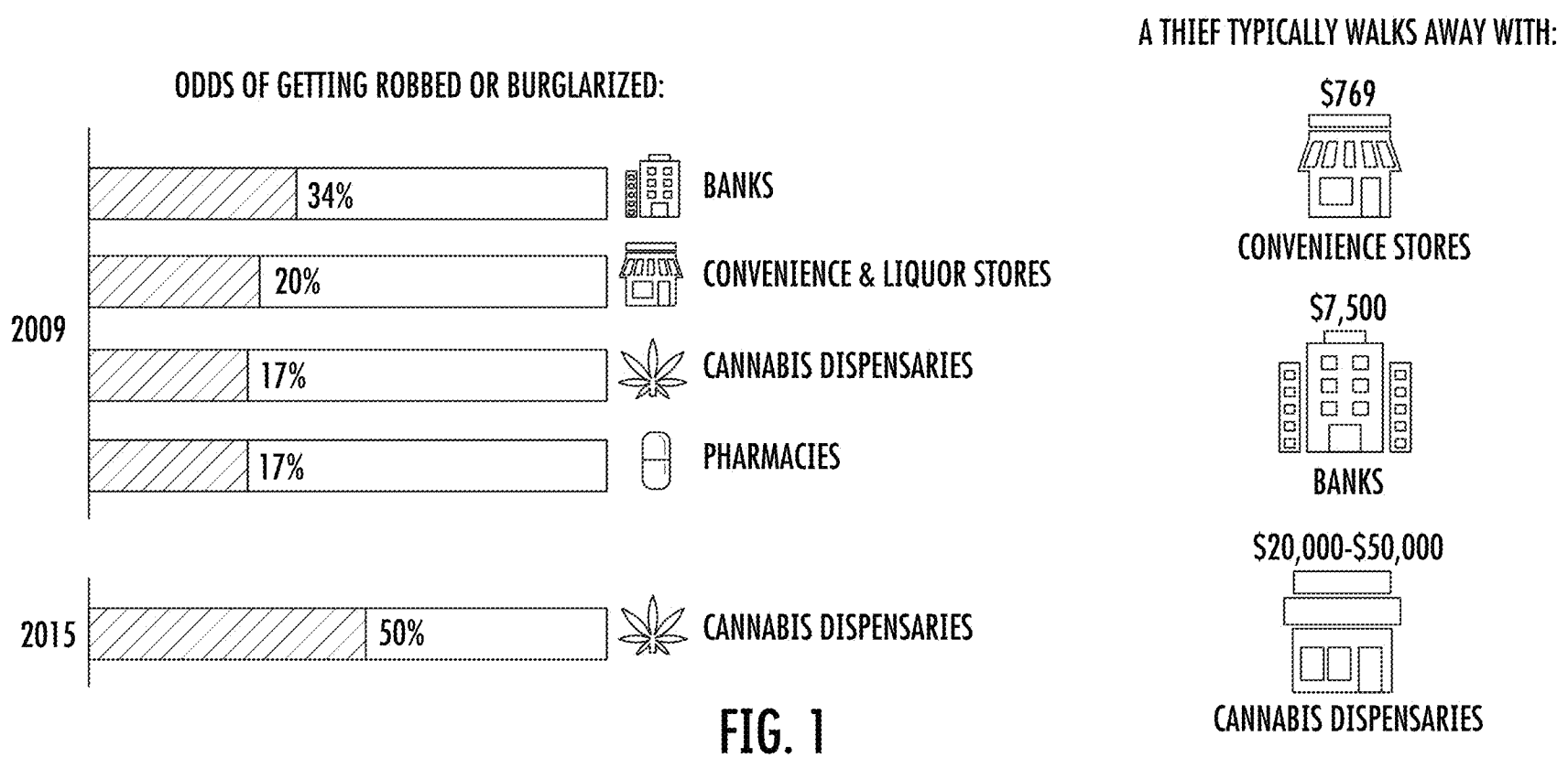

A THIEF TYPICALLY WALKS AWAY WITH:

$769
CONVENIENCE STORES $7,500
BANKS $20,000-$50,000
CANNABIS DISPENSARIES

ODDS OF GETTING ROBBED OR BURGLARIZED:

BANKS

CONVENIENCE & LIQUOR STORES

CANNABIS DISPENSARIES

PHARMACIES

CANNABIS DISPENSARIES

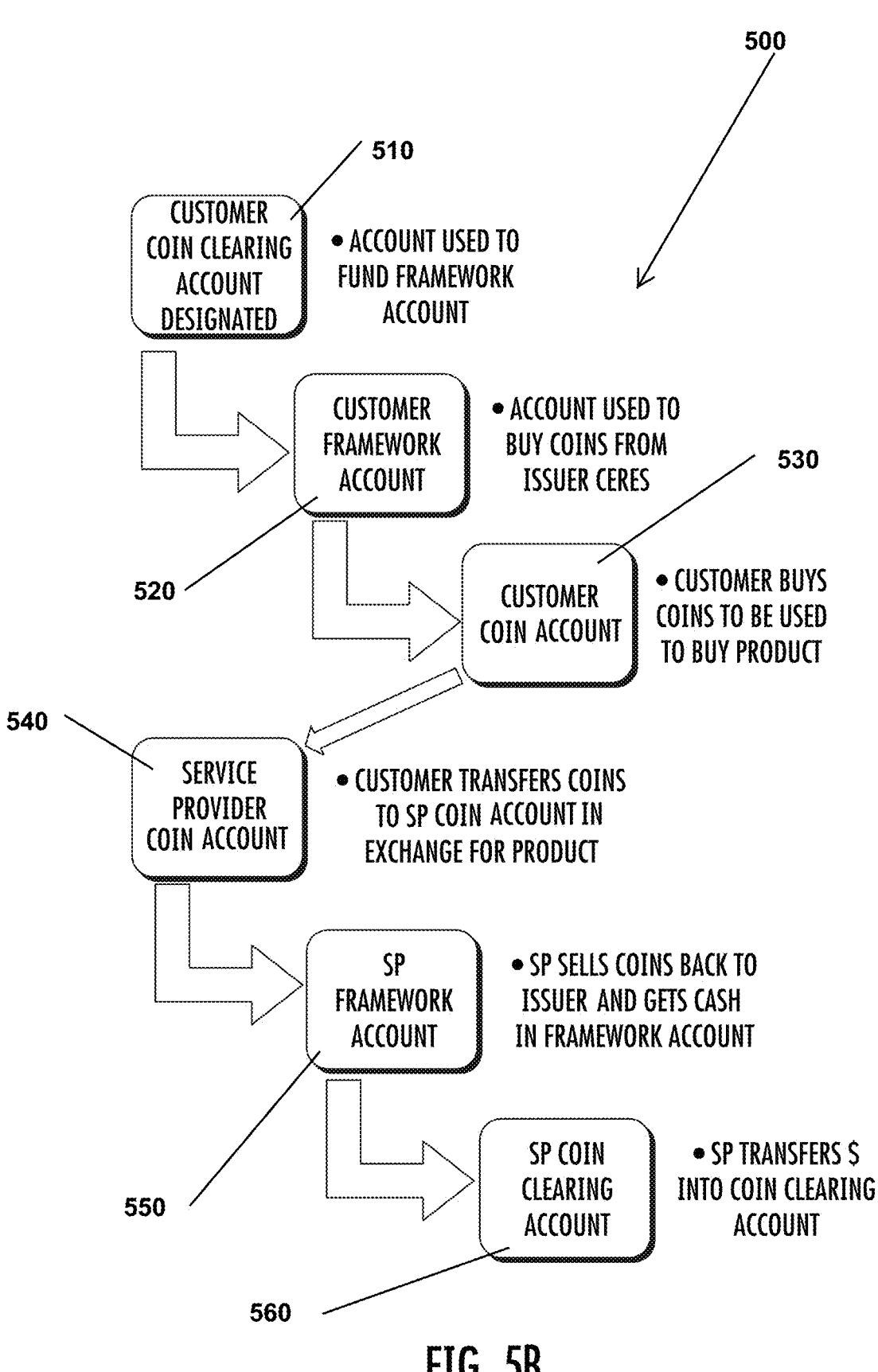

510

CUSTOMER
COIN CLEARING
ACCOUNT
DESIGNATED

• ACCOUNT USED TO
FUND FRAMEWORK
ACCOUNT

CUSTOMER
FRAMEWORK
ACCOUNT

• ACCOUNT USED TO
BUY COINS FROM
ISSUER CERES

530

520

CUSTOMER
COIN ACCOUNT

• CUSTOMER BUYS
COINS TO BE USED
TO BUY PRODUCT

540

SERVICE
PROVIDER
COIN ACCOUNT

• CUSTOMER TRANSFERS COINS
TO SP COIN ACCOUNT IN
EXCHANGE FOR PRODUCT

SP
FRAMEWORK
ACCOUNT

• SP SELLS COINS BACK TO
ISSUER AND GETS CASH
IN FRAMEWORK ACCOUNT

550

SP COIN
CLEARING
ACCOUNT

• SP TRANSFERS $
INTO COIN CLEARING
ACCOUNT

STABLECOIN AS A MEDIUM OF EXCHANGE ON A BLOCKCHAIN-BASED TRANSACTION NETWORK

CROSS-REFERENCE TO RELATED APPLICATIONS

This application is a continuation of U.S. patent application Ser. No. 18/367,617, filed Sep. 13, 2023, which claims priority to U.S. Non-Provisional patent application Ser. No. 17/366,853, filed Jul. 2, 2021, which claims priority to U.S. Non-Provisional patent application Ser. No. 17/098,687, filed Nov. 16, 2020, and issued as U.S. Pat. No. 11,055,677 on Jul. 6, 2021, which claims priority to U.S. Non-Provisional patent application Ser. No. 17/098,308, filed Nov. 13, 2020, which claims priority to U.S. Provisional Patent Application No. 62/934,929, filed Nov. 13, 2019, which are incorporated herein by reference in their entirety and made a part hereof.

FIELD OF THE INVENTION

The present invention relates to various systems and methods using an SEC security as a stablecoin as a store of value and medium of exchange on a blockchain-based transaction network. The present invention may also relate to various systems and methods using a SEC security that is a crypto-asset or stablecoin and is tokenized with the process of tokenizing and digitizing a security. A more specific embodiment includes systems and methods in the *Cannabis* industry (or other highly-regulated industries) and using a SEC qualified or registered debt or equity or some other form of security stablecoin as a medium of exchange on a blockchain-based transaction network or using a SEC qualified or registered debt or equity or some other form of security that is a crypto-asset or stablecoin that is tokenized with the process of tokenizing and digitizing a security.

BACKGROUND

Financial Service Providers. The federal government technically allows banks and other regulated financial service providers ("Bank") to work with, and provide financial services to, individuals/entities participating in the legal *Cannabis* industry. That being said, the current regulatory flux surrounding the legal *Cannabis* industry has made most traditional Banks skittish with respect to providing traditional banking (i.e. checking and/or savings accounts) or other financial services to such participants. This lack of readily available banking services has in turn resulted in the majority of *Cannabis* related businesses being forced to transact business almost entirely in, and to hold large sums of, cash. For multiple reasons, the "all-cash" nature of the current industry only creates additional reluctance for Banks to participate in the industry; trapping industry participants in a vicious circle without a solution. Put another way, industry participants have been forced to deal primarily in cash because Banks are reluctant to provide traditional banking services to them, however much of the reluctance of the Banks to provide such services comes from the current "all-cash" nature of the industry. To make matters worse, for those Banks that are actually willing to get, or who are otherwise considering getting, involved in the legal *Cannabis* industry, the due diligence costs such Banks must incur can be high (particularly due to the current "all-cash" nature of the industry); typically to the point where the transactions are no longer profitable or otherwise worth the regulatory risk to the Bank, and the Bank elects not to offer such services at all. A current lack of transaction transparency within the legal *Cannabis* industry may be the reason for these issues and a better, more sustainable, solution needs to be found.

By way of background, because the federal government classifies *Cannabis* as a prohibited "Schedule 1" drug (i.e. a drug with a high potential for abuse) under the CSA, from the commencement of the legal *Cannabis* industry, Banks have been extremely reluctant to provide banking services to industry participants. Some believe this reluctance arose, in whole or in part, from the reputational stigma associated with the *Cannabis* industry. Most, however, believe that such reluctance arose more so out of the fear of somehow running afoul of the CSA or other applicable laws and being subject to the extremely harsh penalties which could result; including criminal prosecution and/or seizure and forfeiture of assets. Whatever the reason, during the nascent period of the legal *Cannabis* industry, anyone participating directly or indirectly, in such industry essentially became un-bankable.

Banks are currently permitted to offer banking and other services to *Cannabis* related business so long as: (i) the subject business' activities do not involve any of the eight prohibited activities; and (ii) the Bank is able to satisfy all of its required BSA compliance obligations with respect to the subject business and its deposits. That being said, Banks simply do not currently, and frankly cannot, trust cash received from industry businesses without extensive, and often cost-prohibitive, due diligence. For example, how would a Bank know that the cash was not received from one of the eight prohibited activities, and/or that all of its BSA compliance obligations can be satisfied, without extensive due diligence into both the business and the transactions which gave rise to the cash to be deposited. Just imagine how daunting the required due diligence might seem to a Bank where a business walks into a local branch with a duffle bag full of cash from the sale of *Cannabis* looking to set up a checking account. Now imagine how much more likely the Bank might be to offer an account to the same customer if they came in with a detailed, and immutable, record which accounted for every dollar, nay every cent, within that duffle bag as well as each transaction that gave rise to such monies.

Background on Legalization. In the United States, the use and possession of *Cannabis* is illegal under federal law for any purpose, by way of the Controlled Substances Act of 1970 ("CSA"). Under the CSA, *Cannabis* is classified as a Schedule I substance, determined to have a high potential for abuse and no accepted medical use, thereby prohibiting even medical use of the drug. Less than two decades ago, marijuana was illegal in all 50 states. While the decriminalization of marijuana in the U.S. began in 1973, it was not until 1996 that the march toward legalization began.

Today, a majority of the fifty U.S. states have approved *Cannabis* in some form. There is one problem, however, that is faced by everyone involved: the lack of access for the *Cannabis* industry to traditional banking services from a credit union or bank for fear of federal prosecution. Financial institutions are loath to provide banking services because *Cannabis* remains illegal at the Federal level listed as Class I drug on the Controlled Substances Act. There are about 10,500 banks or credit unions in the United States and only 660 provide some type of banking services for the *Cannabis* industry. Of that 660 banks, about ½ provide meaningful services. That is less than 3%.

The costs associated with Bank Secrecy Act (BSA) and Patriot Act compliance force financial institutions to either not bank the industry or charge extraordinary fees associated with the extra compliance tasks that they must undertake. Because there is limited banking this leads to an increased reliance on cash. An increased reliance on cash leads to the following consequences: Decreased transparency and regulatory oversight; Increased chances for money laundering and illicit movement of money; Increased chances for tax avoidance and fraud; and because there is more cash entering the system, it creates a negative feedback loop for banks and financial institutions, as the more cash flows into this industry, the more difficult ensure the transactions do not involve money laundering or illicit monetary transactions.

The *Cannabis* Industry Problem—Because *Cannabis* remains illegal at the Federal level, financial institutions are loath to provide banking services to this industry forcing it to rely on cash creating dangerous situations and increasing the chances for money laundering.

There is currently a lack of banking for this $50 billion (and growing) industry. As a result, many *Cannabis* businesses become an all-cash enterprise, with stories abounding of marijuana related businesses hauling duffel bags filled with cash, making them targets for robberies. All cash businesses are dangerous. Additionally, because *Cannabis* operations default to all cash businesses, tax manipulation and money laundering are major issues. (See FIG. 1).

Money laundering is generally defined as engaging in acts designed to conceal or disguise the true origins of criminally derived proceeds so that the proceeds appear to have derived from legitimate origins or constitute legitimate assets. Generally, money laundering occurs in three stages. Cash first enters the financial system at the "placement" stage, where the cash generated from criminal activities is converted into monetary instruments, such as money orders or traveler's checks, or deposited into accounts at financial institutions. At the "layering" stage, the funds are transferred or moved into other accounts or other financial institutions to further separate the money from its criminal origin. At the "integration" stage, the funds are reintroduced into the economy and used to purchase legitimate assets or to fund other criminal activities or legitimate businesses.

Terrorist financing may not involve the proceeds of criminal conduct, but rather an attempt to conceal either the origin of the funds or their intended use, which could be for criminal purposes. Legitimate sources of funds are a key difference between terrorist financiers and traditional criminal organizations. In addition to charitable donations, legitimate sources include foreign government sponsors, business ownership and personal employment. Although the motivation differs between traditional money launderers and terrorist financiers, the actual methods used to fund terrorist operations can be the same as or similar to methods used by other criminals to launder funds. Funding for terrorist attacks does not always require large sums of money and the associated transactions may not be complex.

Analysis of Financial Conditions—Background. The legal *Cannabis* industry is now poised for a meteoric growth spurt but the current state of regulatory flux surrounding the industry has left industry participants facing significant growing pains. There are two (2) primary issues currently stifling growth within the legal *Cannabis* industry; (1) lack of readily available expansion funding and (2) a heavy reliance on cash to facilitate transactions. Both of which stem primarily from Banks being extremely reluctant to provide banking services and/or funding to *Cannabis* industry participants due to fears of federal/state prosecution.

The industry's current cash reliance issue on the other hand requires a much more unique solution. The use of blockchain and cryptocurrency provides a tremendous opportunity; not only to end the industry's strict reliance on cash as a means to facilitate transactions but also to significantly improve the bookkeeping, and regulatory oversight, of industry participants. While there are several other companies currently offering blockchain/cryptocurrency-based solutions in this area, these solutions are intrinsically flawed. A proprietary Framework and related stablecoin technology is uniquely, and much better, suited to actually solve the subject issues facing the industry. Most notably, unlike all of the other competitive solutions currently being offered, the ONLY stabilized form of cryptocurrency (i.e. the stablecoin) will be provided. Only a stabilized cryptocurrency like the stablecoins, which are tied to the U.S. dollar (or other commonly used currencies), can adequately replace cash as a means of facilitating transactions within this industry and layering these stablecoins under the regulatory guidance/provisions of the SEC adds to further security in the conduct of these transactions.

The stablecoin blockchain system as detailed, has been specifically structured to help solve the above discussed primary issues facing the growing legal *Cannabis* industry today. Through the creation and sale of the Stablecoins and Tokens, there is a unique, industry-first, two-stage solution to answering those issues; establishing both a stable, transactional, form of cryptocurrency for facilitating industry transactions while at the same time allowing investors a vehicle to readily participate in the potential upside of this growing industry.

The current cryptocurrency solutions being offered by the overwhelming majority of current competitors in this space suffer from the following two (2) major flaws:

Not Being Offered In Compliance With U.S. Securities Laws: The underlying cryptocurrency assets of each of these competitors are currently being offered without registration/qualification/exemption under the Securities Act, the Exchange Act or other applicable U.S. securities laws. As a result, the purchase of any such cryptocurrency asset is not (or otherwise should not be) open to U.S. residents. This makes the use of any such competing cryptocurrency asset as a means to facilitate transactions within the U.S. legal *Cannabis* industry impracticable if not outright impossible.

No Stabilization of Value: Each of the current competing cryptocurrency assets is, and will continue to be, subject to price volatility (which will often be erratic and extreme). Further, none of the competitors have made any direct or indirect effort, or have otherwise set forth any plan, to stabilize the value of their respective asset. When the value of a cryptocurrency asset is subject to regular (and often extreme) volatility the viability and appeal of such asset as a transactional currency is limited at best. Resultantly, the use of any such volatile competing cryptocurrency asset as a means to facilitate transactions within the U.S. legal *Cannabis* industry would not just be undesirable; it would not be a workable long-term solution.

These features, along with many others, are discussed in greater detail below.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The follow summary merely presents some concepts of the invention in a simplified form as a prelude to the more detailed description provided below.

Aspects of this disclosure relate to a system for providing a blockchain-based transaction network for a governmental regulatory system, the system comprising: at least one user device and a stablecoin server for a stablecoin securities entity in network communication with a blockchain-based securities stablecoin platform; a blockchain transaction network connected to a governmental regulatory system, the blockchain transaction network operating on the blockchain-based securities stablecoin platform; a distributed blockchain ledger operating on the blockchain transaction network; and a security-backed stablecoin used as a medium of exchange for the one or more transactions between the stablecoin securities entity and the one or more participants. The distributed blockchain ledger may update in real-time the governmental regulatory system. The blockchain transaction network may post and validate one or more transactions between the stablecoin securities entity and one or more participants in a stablecoin ecosystem on the distributed blockchain ledger. The one or more participants in the stablecoin ecosystem may comprise one or more of the following: producers, processors, consumers, financial agents, regulatory agents, or tax agents. The one or more transactions may include transferring the security-backed stablecoin for a product.

In other aspects of the invention, the product may from a regulated industry, wherein the regulated industry may include one or more of the following: legal *Cannabis* industry, real estate industry, tax industry, or liquor distribution industry. The product may be a legal *Cannabis* product from a legal dispensary. The security-backed stablecoin may collateralized by U.S. dollars held in escrow. The security-backed stablecoin may be one of an SEC-qualified security or an SEC-registered security and one of a debt or an equity. The distributed blockchain ledger is cryptographically-secured. The governmental regulatory system may be one or more of the following: a federal regulatory system, a state regulatory system, or a county regulatory system. The blockchain-based securities stablecoin platform and the distributed blockchain ledger may provide transactional information for the one or more transactions to the governmental regulatory system for a history of the product through sourcing, processing, selling, and pricing of the product.

Additional aspects of this disclosure may relate to a system for providing a blockchain-based transaction network for a governmental regulatory system, the system comprising: at least one user device and a stablecoin server for a stablecoin securities entity in network communication with a blockchain-based securities stablecoin platform; a blockchain transaction network connected to a governmental regulatory system, the blockchain transaction network operating on the blockchain-based securities stablecoin platform; a distributed blockchain ledger operating on the blockchain transaction network, wherein the distributed blockchain ledger updates in real-time the governmental regulatory system; and a SEC qualified stablecoin used as a medium of exchange for the one or more transactions between the stablecoin securities entity and the one or more participants. The blockchain transaction network may post and validate one or more transactions between the stablecoin securities entity and one or more participants in a stablecoin ecosystem on the distributed blockchain ledger. The one or more participants in the stablecoin ecosystem may comprise one or more of the following: producers, processors, consumers, financial agents, regulatory agents, or tax agents. The one or more transactions include transferring the SEC qualified stablecoin for a product. The blockchain-based securities stablecoin platform and the distributed blockchain ledger provide transactional information for the one or more transactions to the governmental regulatory system for a history of the product through sourcing, processing, selling, and pricing of the product. The blockchain-based securities stablecoin platform and the distributed blockchain ledger may automatically collect, organize, and submit one or more transaction reports based on the one or more transactions and the transactional information to the governmental regulatory system.

Still other aspects of this disclosure may relate to a system for providing a blockchain-based transaction network for a governmental regulatory system, the system comprising: at least one user device and a stablecoin server for a stablecoin securities entity in network communication with a blockchain-based securities stablecoin platform; a blockchain transaction network connected to a governmental regulatory system, the blockchain transaction network operating on the blockchain-based securities stablecoin platform; a distributed blockchain ledger operating on the blockchain transaction network, wherein the distributed blockchain ledger updates in real-time the governmental regulatory system; and a SEC qualified stablecoin used as a medium of exchange for the one or more transactions between the stablecoin securities entity and the one or more participants. The blockchain transaction network may post and validate one or more transactions between the stablecoin securities entity and one or more participants in a stablecoin ecosystem on the distributed blockchain ledger. The one or more participants in the stablecoin ecosystem may comprises one or more of the following: producers, processors, consumers, financial agents, regulatory agents, or tax agents. The SEC qualified stablecoin may includes one of: registration, qualification, or exemption under the Securities Act, the Exchange Act, or other applicable U.S. securities laws. The one or more transactions include transferring the SEC qualified stablecoin for a legal *Cannabis* product from a legal dispensary. The blockchain-based securities stablecoin platform and the distributed blockchain ledger may provide transactional information for the one or more transactions to the governmental regulatory system for a history of the legal *Cannabis* product through sourcing, processing, selling, and pricing of the legal *Cannabis* product. The blockchain-based securities stablecoin platform and the distributed blockchain ledger may automatically collect, organize, and submit one or more transaction reports based on the one or more transactions and the transactional information to the governmental regulatory system.

Additional aspects of this disclosure may relate to a system for providing a blockchain-based transaction network for a governmental regulatory system, the system comprising: at least one user device and a stablecoin server for a stablecoin securities entity in network communication with a blockchain-based securities stablecoin platform; a blockchain transaction network connected to a governmental regulatory system, the blockchain transaction network operating on the blockchain-based securities stablecoin platform; a distributed blockchain ledger operating on the blockchain transaction network, wherein the distributed blockchain ledger updates in real-time the governmental regulatory system; and a SEC qualified stablecoin used as a medium of exchange for the one or more transactions between the stablecoin securities entity and the one or more participants. The blockchain transaction network may post and validate one or more transactions between the stablecoin securities entity and one or more participants in a stablecoin ecosystem on the distributed blockchain ledger. The one or more transactions may be two-party blockchain transactions, comprising an encryption step, a validation step, and a distribution step. During the encryption step, the transaction may added to the distributed blockchain ledger and encrypted with a digital security code. During the validation step, the digital security code of the transaction may be confirmed and validated. After the transaction is confirmed and validated by several parties, the transaction may exist on the distributed blockchain ledger. During the distribution step, the transaction may be recorded in a public ledger and the transaction is completed. The one or more transactions may include transferring the SEC qualified stablecoin for a product. The blockchain-based securities stablecoin platform and the distributed blockchain ledger may provide transactional information for the one or more transactions to the governmental regulatory system for a history of the product through sourcing, processing, selling, and pricing of the product.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

FIG. 1 illustrates a current *Cannabis* operation as compared to other operations with respect to getting robbed or burglarized.

FIG. 5B illustrates a flowchart with various steps of the example stablecoin blockchain transaction network according to one or more aspects described herein.

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
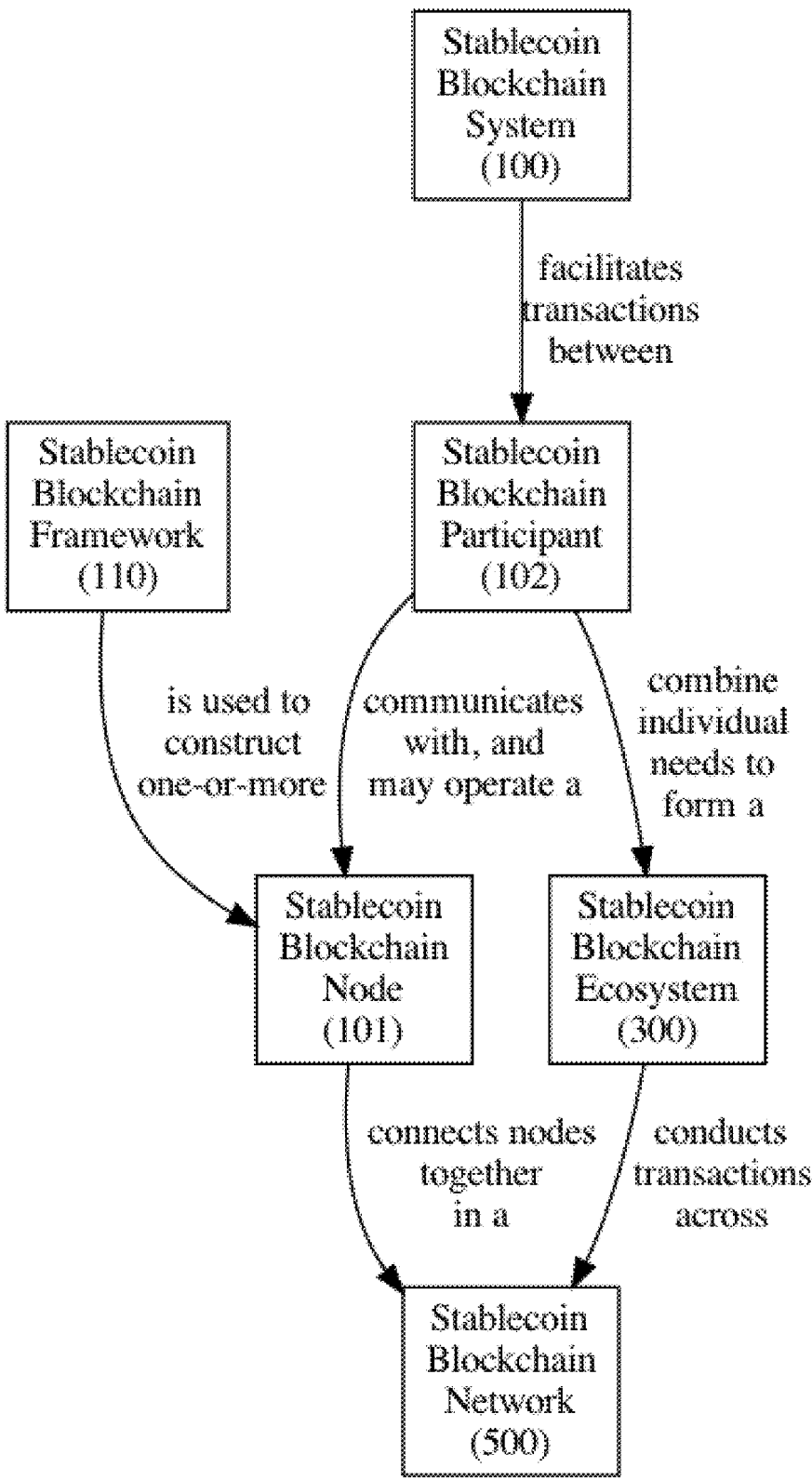
FIG. 2 is a schematic diagram of an example stablecoin blockchain system according to one or more aspects described herein.

Various aspects described herein reference the *Cannabis* industry and/or the legal *Cannabis* industry, or other highly-regulated industries. FIG. 2 illustrates a stablecoin blockchain system 100 with a stablecoin blockchain framework 110, a stablecoin ecosystem 300, and a stablecoin blockchain transaction network 500 in accordance with aspects of this invention. As illustrated in FIG. 2, the stablecoin blockchain system 100 facilitates transactions between stablecoin blockchain participants 102. The stablecoin blockchain participant 102 communicates with, and may operated a stablecoin blockchain node 101. Additionally, the stablecoin blockchain framework 110 may be used to construct one or more stablecoin blockchain nodes 101. The stablecoin blockchain participants 102 may combine as individuals to form a stablecoin blockchain ecosystem 300. The stablecoin blockchain node 101 connects nodes together in a stablecoin blockchain transaction network 500. Lastly, the stablecoin blockchain ecosystem 300 conducts transactions across the stablecoin blockchain transaction network 500.

As will be appreciated by one of skill in the art upon reading the following disclosure, while the *Cannabis* industry and/or the legal *Cannabis* industry is referenced and detailed below, it should be understood that the disclosed stablecoin blockchain system 100 and stablecoin framework 110 is applicable to any regulated industry and/or any industry with financial tracking needs for payment systems. For example, regulated industries or highly-regulated industries that can utilize the stablecoin blockchain system 100 and stablecoin framework 110 may include, but not be limited to, real estate, taxes, firearms, liquor distribution, and other highly regulated industries. Other industries with financial tracking and fund disbursement, such as state and federal grant payments and disbursement, may utilize the stablecoin blockchain system 100 and stablecoin framework 110. For example, the most recent Federal Paycheck Protection Program (PPP) could have successfully utilized the stablecoin blockchain system 100 and stablecoin framework 110 for payment tracking and funds disbursement. Additional opportunities may exist for other governmental tracking, such as: death records, birth records; or marriage records without departing from this invention.

There are two very important issues plaguing the legal *Cannabis* industry (and other highly-regulated industries) today; (1) an overwhelming reliance on cash as a transaction medium; and (2) a severe lack of traditional banking/checking services. The stablecoin blockchain system 100 and the stablecoin blockchain framework 110 and related stablecoin technology can help solve both of these issues. Specifically, the use of the stablecoins 120 can effectively and efficiently replace cash as the primary transaction medium within the legal *Cannabis* industry and any other highly-regulated industry, and the transparency/trust created by the stablecoin blockchain system 100 and the stablecoin blockchain framework 110 can help establish viable and sustainable banking solutions for industry participants. The stablecoin blockchain system 100 and the stablecoin blockchain framework 110 provide a blockchain compliance and transparency solution to provide a financial infrastructure for highly-regulated and/or financially-tracked industries, such as, for example, the legal *Cannabis* industry.

A blockchain-based solution (i.e. like the stablecoin blockchain framework 110) is an ideal mechanism for creating transparency and fostering Bank/regulator trust of those participating in the legal *Cannabis* industry. Blockchain is a highly effective trust mechanism which, generally speaking, uses a cryptographically-secure shared ledger to irrefutably track complex transactions amongst many known parties. The key attributes of blockchain technology which make it an ideal solution are the following:

Continuous and Immutable Record: Blockchain technology, by its design, creates an ongoing record of all transactions (i.e. each a block) within the subject system. Additionally, blockchain technology ensures (via cryptography) that once a transaction has been entered into the ledger (i.e. the chain), and appropriately verified, such record can no longer be altered.

Figure 4:
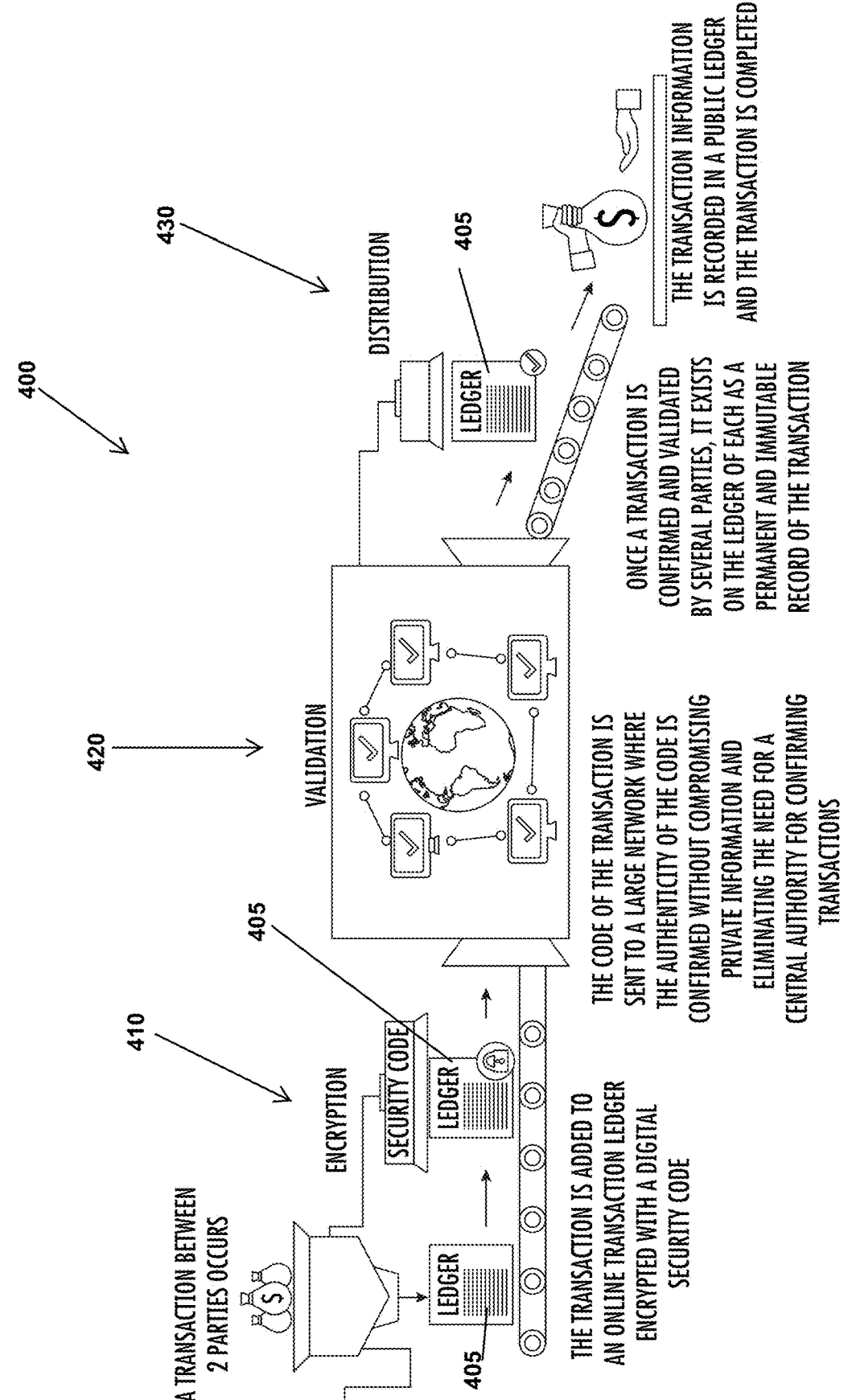
FIG. 4 is a graphical depiction of an example blockchain transaction according to one or more aspects described herein.

Full Transparency: A blockchain ledger, by its design, is held simultaneously, and requires validation, by certain sources within the system. Each transaction may require multi-party verification before it can be entered into the ledger creating full transparency with respect to each transaction. Moreover, a blockchain ledger can be easily shared (in real-time) with outside regulators and other parties to assist in satisfying compliance and related issues. FIG. 4 illustrates a graphical depiction of a two party, blockchain transaction.

Blockchain is rapidly becoming a world leading technology due its inherent ability to facilitate the assured exchange of value (in both digital and tangible assets) between parties, while simultaneously being able to protect their respective privacy and virtually eliminate fraud. Its relevance and applicability to regulating transactions within the legal *Cannabis* industry is similar to many other industry chain-of-custody applications currently moving toward blockchain based solutions; such as the pharmaceutical distribution and food production industries. The core benefits of all such commercial blockchain applications are generally the same; assuring the health and safety of consumers, preventing fraud and counterfeit transactions, and creating a transparent (while simultaneously privacy protected) record of transactions upon which interested parties (including Banks and other regulators) can rely.

As described herein, a stablecoin blockchain system 100 includes a blockchain-based, transaction framework 110 which is designed specifically to facilitate, to increase the transparency of, and to ease regulatory verification/oversight of, transactions within highly-regulated industries, such as the legal *Cannabis* industry. Further, the stablecoin blockchain framework 110 has the ability to capture, and maintain an immutable record of, all participant transactions; from seed to final sale. With the increased transaction transparency and trust which will be created by the use of the stablecoin blockchain framework 110, Banks may be more open to offering services to any participants of the stablecoin blockchain framework 110. Equally, if not more importantly, for industry participants utilizing the stablecoin blockchain framework 110 all transactions will be facilitated with the use of the stablecoins 120. The use of stablecoins 120 may eliminate the need of such participants to transact in, and hold large sums of, cash. In fact, the stablecoins 120 may be utilized as a cash alternative within highly-regulated industries. The stablecoins 120 may replace cash as the primary means of facilitating highly-regulated industry transactions.

In one embodiment of this invention, the various systems and methods may bridge two transformative industries of the 21st century, blockchain and highly-regulated industries, such as *Cannabis*, to create a compliance and transparency based financial transaction network to solve the banking issues for the highly-regulated industries, such as the legal *Cannabis* industry. Embodiments of the invention includes a stablecoin blockchain system 100 that provides a financial services company for highly-regulated industries, such as the legal *Cannabis* industry with a blockchain-based transaction network providing supply chain tracking (or seed-to-sale tracking), payments, and compliance.

In another embodiment of this invention, systems and methods in the *Cannabis* industry (or other highly-regulated industries) may use an SEC security, wherein the SEC security may be a SEC qualified or registered debt or equity, as a stablecoin 120 as a store of value and medium of exchange on a blockchain-based transaction network. In another embodiment, systems and methods in the *Cannabis* industry (or other highly-regulated industries) may use an SEC security, wherein the SEC security is a SEC qualified or registered debt or equity, that is a crypto-asset or stablecoin 120 and is tokenized with the process of tokenizing and digitizing a security. The systems and methods may streamline information flow because the transactions are all maintained in one place.

The systems and methods may provide a novel process and way to turn securities into a stabilized transactional currency providing compliance and transparency. Additionally, the systems and methods may include chain of custody tracking for every transaction with an SEC secured stablecoin 120 throughout the process—from dispensary to final purchase. In another embodiment, the systems and methods may include further chain of custody tracking for every transaction with the security-backed stablecoin 120 throughout the process—from "seed-to-sale," meaning from initial growing and planting of the seed to the final sale/purchase by the consumer and user of the *Cannabis*. This chain of custody tracking may tie into product recalls and/or federal transactional auditing. The systems and methods may also include automated regulatory filings driven by the transaction log (Suspicious Activity Report—SAR). Additionally, the systems and methods may create an automated auditing platform that includes auditing reports with the opportunity to partner with an auditing firm. The systems and methods may tie all of the supply chain components together under one financial transaction log and putting it all into an SEC tracking regime.

The methods and systems may include a business service provide and security firm focused on technology, compliance, and security solutions that provide a peer-to-peer methodology for conducting secure, auditable, financial transactions. The methods and systems provide a method of tracking assets and goods within the supply chain through the use of a security-backed stablecoin 120 as a medium of exchange in a blockchain transaction network 500.

Figure 3:
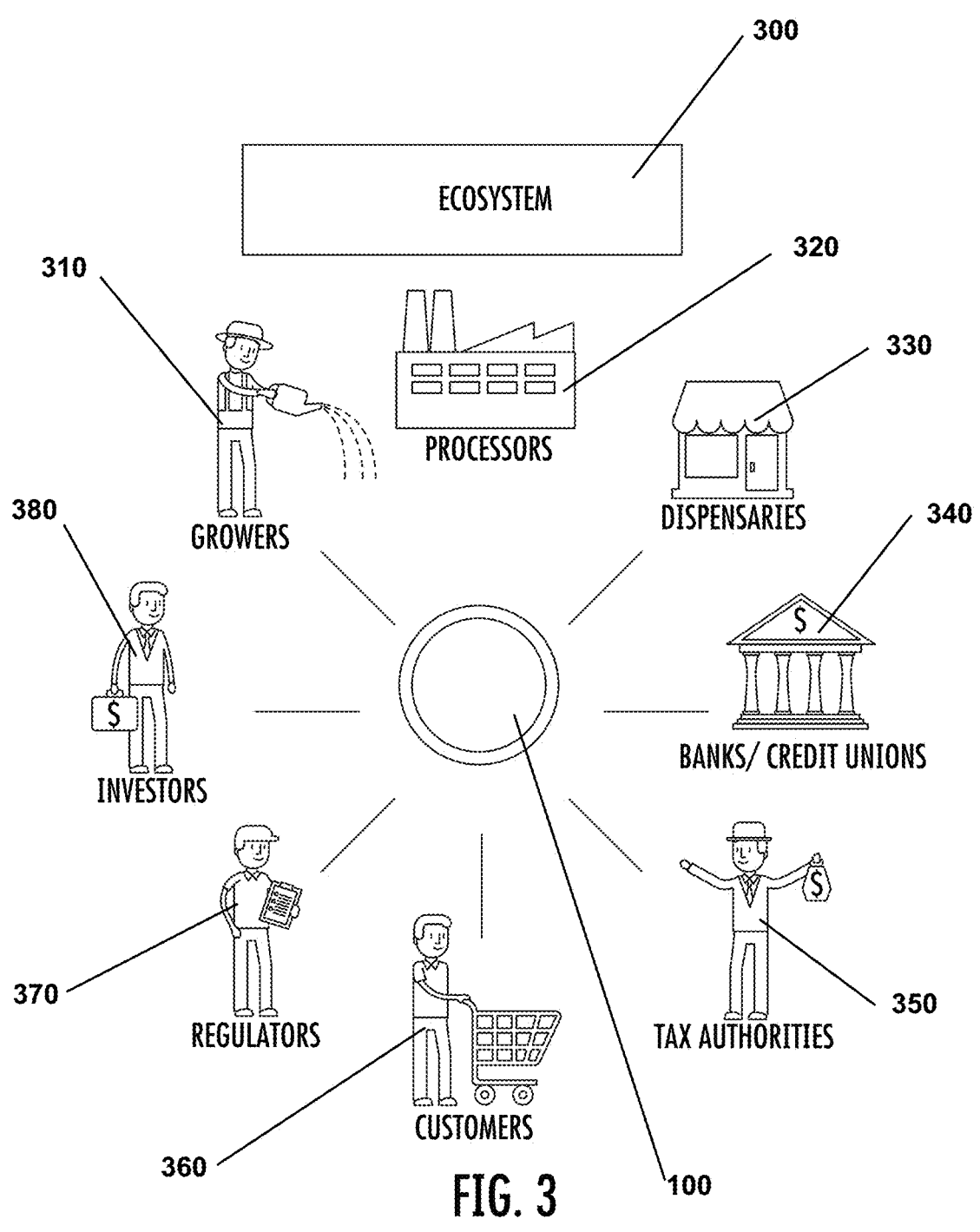
FIG. 3 is a schematic diagram of an example ecosystem to bring together both a seed-to-sale decentralized ledger and a currency attached to that ledger according to one or more aspects described herein.

STABLECOIN ECOSYSTEM. FIG. 3 illustrates a stablecoin ecosystem 300 as part of the stablecoin blockchain system 100. As illustrated in FIG. 3, the stablecoin ecosystem 300 may include one or more of the following entities: growers (or component/part suppliers) 310, processors (or manufacturers) 320, dispensaries (or retailers) 330, Banks/credit unions 340, tax authorities 350, customers 360, regulators 370, and investors 380. More generally, the stablecoin ecosystem 300 may include: Producers, Processors, Consumers, Financial Agents, Regulatory Agents, and Tax Agents. The stablecoin ecosystem 300 may include other entities that participate in the transactions and financial systems of the various industries.

Growers (or component/part suppliers) 310: The stablecoin blockchain system 100 may assist growers or component/part suppliers 310 with real-time inventory management and improved projections of supply and demand. The stablecoin blockchain system 100 may also produce and elicit trends of consumption through data analytics for the growers or component/part suppliers 310.

Processors (or manufacturers) 320: The stablecoin blockchain system 100 may assist processors (or manufacturers) 320 with real-time inventory management and improved projections of supply and demand. The stablecoin blockchain system 100 may also produce and elicit trends of consumption through data analytics for the processors (or manufacturers) 320.

Dispensaries/Retailers 330: The stablecoin blockchain system 100 may reduce the transactional friction which exists with the U.S. Dollar because of conflicts between state and federal laws. The stablecoin 120, as an SEC-regulated security, may reduce that transactional friction. The stablecoin ecosystem 300 and the stablecoin blockchain system 100 can also assist dispensaries/retailers 330 by identifying supply/demand gaps and showing ways to mitigate those gaps, providing feedback mechanisms to growers 310 and processors 320 (producers), and use data to create predictive insights. Additionally, the stablecoin 120 may reduce the challenges of a primarily cash business. By lessening the amount of cash a retailer 330 receives, a more profitable and efficient transaction is created. The stablecoin ecosystem 300 as illustrated and described in this invention is the first ecosystem to bring together both a seed-to-sale decentralized ledger and a stable currency/stablecoin 120 attached to that ledger.

Regulators 370: The stablecoin blockchain system 100 may help the local government regulators 370 track transactions and take control of sourcing, selling, and pricing of products. The stablecoin blockchain system 100 may also reduce or eliminate black market sales significantly.

FRAMEWORK. The stablecoin blockchain system 100 will consist initially and primarily of maintenance of a blockchain-based, transaction framework 110 which will utilize the stablecoins 120 to facilitate transactions related to, and to case regulatory verification of, the growth, processing, and sale of *Cannabis* in the states/territories in which such sale is legal. The stablecoin blockchain framework 110 may be either a private blockchain or a public blockchain without departing from the system.

Stablecoins 120 may be cryptocurrencies or tokens that are designed to be stable in value and have the same price as traditionally stable currencies like the U.S. dollar or assets like gold. The stablecoins 120 may be an SEC-regulated security as a store of value or a medium of exchange on the stablecoin blockchain transaction network 500.

The stablecoin blockchain framework 110 and related stablecoin technology avoid falling victim to the above flaws. First, the stablecoins 120 may be treated as securities and all stablecoins 120 may be offered and sold in full compliance with applicable U.S. securities laws as provided herein, i.e. SEC-regulated stablecoins 120. Second, as a result of the Buyback transactions, each stablecoin 120 can and will stabilize the value of each stablecoin 120 to make them a truly viable replacement for cash in facilitating transactions within the U.S. legal *Cannabis* industry or any other highly-regulated industry. Additionally, the stablecoin blockchain system 100 and the stablecoin blockchain framework 110 with related blockchain technology provides the following advantages: tax authorities may be paid in real-time via the stablecoin ecosystem 300 and smart contracts; financial institutions may provide mainstream banking services as the stablecoin blockchain system 100 may reduce AML/KYC and other compliance costs; *Cannabis* operators will be able to access traditional banking services as all transactions will be tracked using the stablecoin 120 and Banks can identify to the penny the origin of each and every transaction; State and Federal Regulators may have unfettered transparency providing for easier compliance and regulatory oversight; and stablecoin users will receive dividend payment based on use of stablecoins 120.

In short, the stablecoin blockchain framework 110 and related stablecoin technology represent a unique, and truly viable, transaction solution to those operating in the U.S. legal *Cannabis* industry.

The stablecoin blockchain system 100 includes a blockchain-based, transaction framework (the "Framework") 110, and related form of cryptocurrency (each a "Coin") 120, each of which will be identified by a unique identification number (respectively, the "Coin ID Number"). The stablecoin blockchain framework 110 may be a private blockchain or a public blockchain without departing from this invention. The stablecoin blockchain framework 110 and the stablecoin 120 may facilitate transactions related to, and to ease regulatory verification of, the manufacture, distribution, and sale of highly-regulated goods in states/territories, for example as the growth, processing, and sale of legal *Cannabis* in the states/territories in which such sale is legal. Stablecoins 120 are, and will at all times be, electronic assets.

The stablecoin blockchain system 100 utilizes the stablecoin blockchain framework 110 to alleviate the highly-fragmented *Cannabis* market by both: (i) establishing a common transaction system or stablecoin blockchain transaction network 500 (and a common form of payment, i.e. the stablecoin 120) which industry providers and purchasers can use to facilitate transactions; and (ii) creating an immutable, auditable, ledger of industry transactions which will ease transaction verification by regulators. In addition, the stablecoin blockchain framework 110 may allow for the creation and utilization of smart contract solutions between parties (e.g. Producers, Processors, Consumers, Financial Agents, Regulatory Agents, or Tax Agents, etc.) which will permit the automatic recording and facilitating the exchange of goods, services, and private data as well as the automatic calculation, recording and payment of applicable taxes.

Similar to other underlying cryptocurrency protocols, the stablecoin blockchain system 100 is a blockchain-based ledger and payment processing system which will provide for a distributed, and immutable, record of participant activity by mandating consensus among a quorum of network participants to initiate/update transactions.

FIG. 4 illustrates a graphical depiction of a two-party blockchain transaction 400 on a ledger 405. As illustrated in FIG. 4, the two-party blockchain transaction 400 may include encryption 410, validation 420, and distribution 430. First, a transaction and agreement (smart contract) will occur between two parties. During encryption 410, the transaction may be added to an online transaction ledger 405 and encrypted with a digital security code. During validation 420, the code of the transaction may be sent to a large network where the authenticity of the code is confirmed without compromising private information and eliminating the need for a central authority for confirming transactions. Once the transaction is confirmed and validated by several parties, the transaction exists on the ledger 405 of each as a permanent and immutable record of the transaction. During distribution 430, the transaction information is recorded in a public ledger and the transaction is completed.

However, while the majority of cryptocurrencies in circulation today are sold/traded via a public infrastructure, in one embodiment of the invention, the stablecoin blockchain framework 110 may be a closed, and internally maintained, infrastructure. This means that only those persons that have established and maintain an account on the stablecoin blockchain framework 110 (i.e. a Framework Account), or who have otherwise been given special access (e.g. certain agents of governmental/regulatory bodies, as applicable), will be permitted to access the stablecoin blockchain framework 110 and/or any information made part of the underlying ledger 405. In another embodiment of the invention, the stablecoin blockchain framework 110 may be based on a public infrastructure as is used in a majority of blockchain framework systems.

As used herein, the stablecoin blockchain framework 110 may also include a set of core rules for, among other things: (i) establishing the underlying distributed ledger 405 making up the stablecoin blockchain framework 110; (ii) establishing the set of traceable data to be included in such distributed ledger 405; (iii) establishing the procedure for posting/validating transactions to such distributed ledger 405; and (iv) establishing who will have access to the information provided in such distributed ledger 405.

The set of traceable data that may be tracked via the stablecoin blockchain framework 110 may include, but is not limited to: (1) the license information of all stablecoin blockchain framework 110 users who are required to be licensed (e.g. cultivators/processors/dispensaries/purchasers, as applicable); and (2) the purchase/sale/transfer of each stablecoin transaction and all related goods and services, including for each such transaction: a record of the date/time/location of the subject transaction; a record of all purchasing/selling parties (including all applicable license information for each such party, if any); an invoice for all goods bought/sold/transferred (including specific identification of the types/quantity of such goods); a record of all taxes paid/payable in connection with the subject transaction; a record of any/all goods transporting parties as well as a real-time record of the initiation/completion of the respective transporting activities; and a real-time record of the current status of the subject transaction (e.g. initiated, in-transit, completed).

BLOCKCHAIN/LEDGER. The stablecoin blockchain framework 110 may be built on, and is an extension of, a stablecoin blockchain ledger protocol (such as, for example, the Hyperledger Fabric protocol). The blockchain ledger protocol may update to the stablecoin blockchain framework 110 and the distributed ledger 405, which will require consensus from certain key participants of the stablecoin blockchain framework 110. Each of those key participants of stablecoin blockchain framework 110 may operate one or more nodes on the stablecoin blockchain framework 110. The stablecoin blockchain ledger protocol may include a modular architecture, which allows for dynamically adaptable validation and consensus rules; including the ability to simultaneously require both technical validation and legal validation for purposes of consensus. This allows the stablecoin blockchain system 100 to create the complex set of validation protocols necessary to facilitate the below mentioned automatic rejection capabilities. The stablecoin blockchain ledger protocol may also allow for the inclusion of outside audit capabilities on a separate, recorded, "chain" implemented as an outside audit channel. Such auditing outside users will be able to accesses some/all of the information provided in the underlying general ledger 405 while not being able to change/alter any such information in any way. This feature may be important to allow for review of some/all of the underlying transitional information by applicable overseeing governmental, banking and other regulating bodies.

In an example embodiment of the invention, the validation protocol utilized by the stablecoin blockchain framework 110 to vet updates/modifications to the stablecoin blockchain framework 110 and distributed ledger 405 may be a consensus algorithm/mechanism, for example, a "proof-of-authority" protocol or any other consensus algorithms that may be deployed as this technology matures. The consensus algorithm/mechanism may be essentially a modified form of the "proof-of-stake" protocol where instead of a stake based on monetary value, a validator's identity acts as the stake. In this context, identity means the correspondence between a validator's personal identification on the platform with officially issued documentation for the same person (i.e. certainty that a validator is exactly who that person represents to be). The "proof-of-authority" protocol may be superior to existing "proof-of-work" and "proof-of-stake" protocols in terms of both transaction efficiency and security. However, to utilize the consensus algorithm/mechanism most effectively, the stablecoin blockchain system 100 and the stablecoin blockchain framework 110 may be a closed, permission based, network. Validation protocols or other consensus algorithm/mechanism other than the "proof-of-authority" protocols may be utilized by the stablecoin blockchain framework 110 to vet updates/modifications to the stablecoin blockchain framework 110 and the distributed ledger 405.

Key stakeholders in the stablecoin blockchain framework 110 will be the primary operators of the validation nodes and will be the only ones with full access to the data on the stablecoin blockchain framework 110 and distributed ledger 405. Such key stakeholders are anticipated to include the stablecoin blockchain system 100, select participating financial/banking institutions, select participating *Cannabis* growers/processors/dispensaries, and certain other stablecoin blockchain framework 110 participants authorized. The onboarding and selection of persons/entities who will be permitted to operate validation nodes within the framework 110 may be primarily based on the respective expertise/fiduciary responsibility/regulatory authority of the subject person/entity. Generally speaking, each of the following regulated parties will be eligible to participate as validating nodes within the stablecoin blockchain framework 110: fully licensed service providers in the legal *Cannabis*; registered transfer agents; governmental authorities/regulators; third-party Required Verification providers; and legal/audit firms.

The onboarding and selection of persons/entities who will operate validating nodes within the stablecoin blockchain framework 110 may be added and may operate the sole validating node within the stablecoin blockchain framework 110. Further, any person/entity operating a validating node within the stablecoin blockchain framework 110 may be removed. For the avoidance of doubt, no retail customer will be eligible to operating a validation node.

In addition to the foregoing, the stablecoin blockchain framework 110 may be hardcoded to automatically reject certain pre-determined prohibited transactions, including automatically rejecting any and all transactions where: the product/service purchaser is required pursuant to applicable law to be properly licensed and is not so licensed; the product/service purchaser is required to purchase products/services solely from a particular medical dispensary and the respective transaction is not being made at such location; the product/service seller is required pursuant to applicable law to be properly licensed and is not so licensed; and/or any product/service transporter involved in the respective transaction are required pursuant to applicable law to be properly licensed and are not so licensed.

Furthermore, according to other embodiments, blockchain technology, distributed ledger technology (DLT) 405, stablecoin/cryptocurrencies 120, and related developments have the potential to radically transform business process and financial transactions. Embodiments of this invention may include blockchain/DLT 405 advances to the legal *Cannabis* industry or other highly-regulated industries. Through creation of a hybrid on-chain/off-chain model, the stablecoin blockchain system 100 and distributed ledger technology 405 may provide a solution that addresses the most pressing banking, finance, and regulatory issues facing the market, while doing so in a way that is both cryptographically secure as well as highly performant.

Blockchain/Distributed Ledger Technology (DLT) Fundamentals. At the center of the blockchain is the block, a set of information I at a particular time t. The contents of this block are agreed upon by participants of the network through the use of some consensus algorithm. Additions and modifications to information I are collected and stored in the subsequent block It+n where n is some interval (either fixed or variable). Integrity of the sequence of block changes are handled by chaining of the blocks. This is done through including the hashcode of the prior block in the data of the current block. By including this link, a chain of blocks may be created, thus the name "Blockchain."

The centralization spectrum. One goal of various blockchain networks are to achieve decentralization of the information persisted to the chain. In common data storage systems, data is persisted to a central repository. This creates both a single point-of-failure as well as a singular authority who must be believed to be credible for the information stored in the system to be trusted. To remove this reliance on an outside authority, all nodes on the network retain a complete copy all blocks. This means that the failure of any particular node will not result in loss of data, and also that the integrity of data can be confirmed through the use of the consensus algorithm. Specifically, information within a block may be considered valid if a majority of nodes operating on the network confirm the validity.

While, the model for various blockchain networks may be intended to remove the reliance on a central authority, this is not the only possible solution. The degree of centralization for any particular blockchain design exists on a spectrum with full decentralization on one end, and a completely centralized network where blocks are computed and validated by a single entity at the other end. In between those two extremes, a variety of shades-of-decentralization exist.

The permissioning spectrum. Various blockchain networks fully decentralize their solution and further create a permissionless network. In this context, permissionless means that any computer, operated by any party, is able to join the blockchain network as a node without review or validation by an outside party. If an outside party is able to review/restrict machines from joining the network as a node, that party can in-effect control the network by allowing only nodes that it controls or influences to be added.

Similar to centralization, the degree of permissioning around nodes exists on a spectrum, with the degree of centralization being directly proportional to the degree of permissioning. However, the degree of permissioning is not necessarily proportional to the degree of centralization i.e. a centrally controlled network could be permissionless, although in practice this is rarely the case. In general, the higher degree of permissioning required for a node to join the network creates a correspondingly higher degree of implicit trust of the nodes.

Economics of the blockchain. If no central party exists to control the blockchain, and new parties can add and remove nodes from the network at will, how does a stablecoin blockchain system 100 prevent bad actors from injecting bad data into the chain? Motivations for such actors can be varied and include accident, intent-to-disrupt (DoS), or intent to defraud.

Various blockchain solutions attempt to address these concerns through the use of incentives built into the consensus algorithm and seek to establish a situation where for any particular node of the network, the value of being a good actor is greater than the value of being a bad actor. $(reward\_\{good\}*probability\_\{reward\_\{good\}\}>reward\_\{bad\}*probability\_\{reward\_\{bad\}\})$ The stablecoin blockchain transaction network 500 may be not fully decentralized, but instead decentralizes control of the network across the various parties engaged in transaction. As described previously, all participants have an intrinsic motivation to be good actors, and the consensus algorithm/mechanism from the stablecoin blockchain transaction network 500 allows the number of nodes to be expanded or reduced based upon consensus between active participants.

The stablecoin blockchain system 100 permissioning may utilize a PoA as its consensus mechanism, the stablecoin blockchain transaction network 500 relies on permissioned access for network nodes. Additional nodes can be added and existing nodes can be removed based on consensus voting among active nodes. New prospective nodes can be verified to ensure they are actual participants in the ecosystem, and therefore have a shared interest in its proper operation, and the rapid ability to vote and add new nodes provides an effective mechanism for scaling the network as transaction volume grows.

Data on the blockchain. Because blockchain data is fully replicated on each and every network node, data storage requirements grow geometrically as a function of the number of nodes. In addition, due to the periodic nature of block computation and the overhead of consensus building across the nodes, blockchain is a poor mechanism for storage of both large amounts of data and data that changes frequently.

The respective distributed ledgers 405 used to record transfers of ownership of the stablecoins 120 may retain the complete trading history of each stablecoin 120 from its respective initial issuance and certain portions of such distributed ledger 405 may be made available to the public. In particular, each of the stablecoins 120 will be represented by ledger balances and secured by cryptographic key pairs; a public-key for transfers into the respective cryptographic wallet/account (i.e. Coin Holding Account) and a private-key for accessing the subject cryptographic wallet/account and managing the stablecoins 120 held therein. Only the public-key address may be generally exposed to the public on the respective distributed ledger. Certain specific information, including the personal identity information necessary to associate a public-key representing a given block of stablecoins 120 with the respective owner of those stablecoins 120, may be maintained in a proprietary ledger system (i.e. the Coin Ledger) that will not be generally exposed to the public.

As discussed herein, the stablecoins 120 are, and will be, solely represented by ledger balances and secured by cryptographic key pairs. The associated private-key is necessary to affect the sale/transfer of a given block of stablecoins 120 and, as such, is meant to be kept private. The general public, however, is not yet accustomed to using secure cryptographic methods and managing private-keys. To make the system more user-friendly, at least initially, the stablecoin blockchain system 100 may hold the respective private-keys on behalf of stablecoin holders. This will enable stablecoin holders to more easily manage their digital Securities account via a simple login and password. Additionally, the system may allow for users to have recourse if private keys are lost, such as similar to a brokerage account.

The stablecoin blockchain system 100 may include and continuously maintain, in as current a form as is commercially and technologically possible, a ledger 405 (such ledger, the "Coin Ledger") identifying, at a minimum: (i) the name and last known mailing address of each stablecoin holder; (ii) the number of all stablecoins held by each stablecoin holder; (iii) the respective Coin ID Numbers of all stablecoins held by each Coin Holder; and (iv) the last known Coin Clearing Account of each holder. Without limiting the generality of the foregoing, the stablecoin blockchain system 100 may cause the Coin Ledger 405 to be updated as, when, and to the fullest extent, necessary to reflect, in real-time, any and all transfers of stablecoins 120; including reflecting any and all transfers of stablecoins, and the cancellation of the same, in connection with a Buyback.

The stablecoin blockchain system 100 may maintain the Coin Ledger 405 in a blockchain based/compatible electronic format. Further, the stablecoin blockchain system 100 may take all commercially reasonable actions necessary to secure the Coin Ledger 405 from tampering or other improper access or use. The Coin Ledger 405 will be held in strict confidentiality through the stablecoin blockchain system 100 provided that a particular stablecoin holder will be entitled, at any time, to access their respective account information via their respective Framework Account. Additionally, the stablecoin blockchain system 100 may provide access to/copies of any portion of the information provided for in the Coin Ledger 405 if, and to the extent, requested by any regulatory or banking agency in connection with the sale of the stablecoins 120 and/or the operation of the stablecoin blockchain system 100.

The stablecoin blockchain system 100 may maintain the Coin Ledger 405 internally (as part of the stablecoin blockchain framework 110) and may not require the engagement of any Transfer Agent with respect to the maintenance of any information therein or any payments to be made to the stablecoin holders.

TRANSACTION NETWORK. The stablecoin blockchain system 100 may include a stablecoin blockchain transaction network 500 to provide a mechanism for electronic purchase and payment of goods for the U.S. legal *Cannabis* market or other highly-regulated industries. Participants in this rapidly growing sector have found themselves unable to access traditional means of electronic payment due to current discrepancies between state and federal law.

Figure 5A:
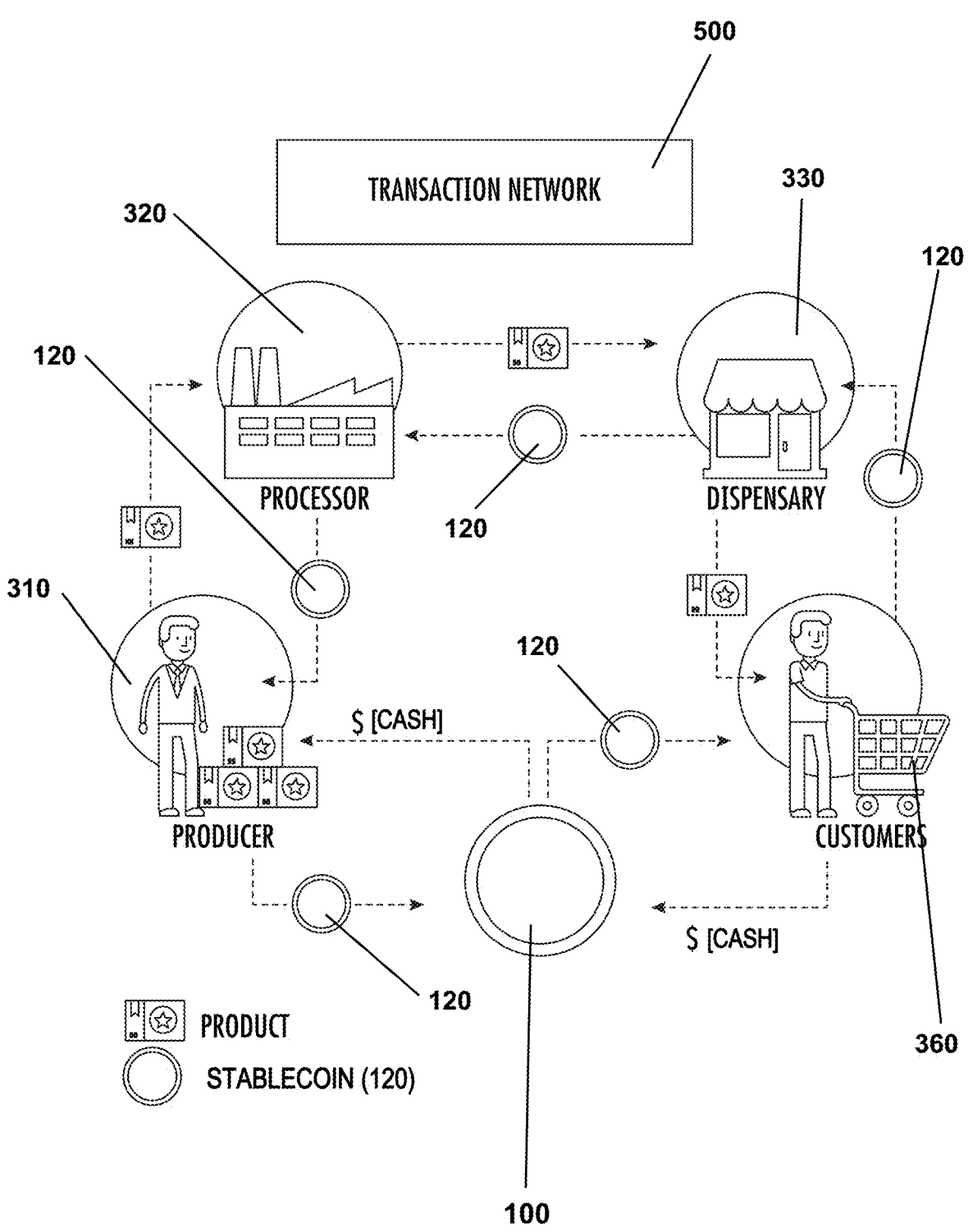
FIG. 5A is a schematic diagram of an example transaction network according to one or more aspects described herein.

FIGS. 5A and 5B illustrate an exemplary stablecoin blockchain transaction network 500 of the blockchain system 100 in accordance with the invention. Specifically, FIG. 5A illustrates a pictoral/graphical representation of the stablecoin blockchain transaction network 500 and FIG. 5B illustrates a flowchart with various steps of the stablecoin blockchain transaction network 500. The stablecoin blockchain transaction network 500 and the stablecoin blockchain system 100 may provide the potential benefits of the rate of speed and cost effectiveness, particularly in areas like supply chains. The consumers may benefit from greater information about the product as well as pricing. The stablecoin 120 eliminates the transactional friction for *Cannabis* operators as well as providing them targeted data and analytics.

Additionally, the stablecoin blockchain transaction network 500 provides a solution to the actual banking problem with highly-regulated industries by providing a stablecoin 120 as an SEC-regulated medium of exchange and a blockchain-based ledger to provide a seed-to-sale compliance and transparency infrastructure.

FIGS. 5A and 5B illustrate a blockchain-based financial infrastructure tool and stablecoin blockchain transaction network 500 that utilizes a stablecoin 120 as its centerpiece, where every transaction utilizing the stablecoin 120 posts to an immutable auditable ledger. The ledger may contain the key information needed by financial institutions to be compliant with FINCEN AML rules as wells as the Patriot and Bank Secrecy Acts. The stablecoin 120 may be an SEC-regulated security.

The following flowchart/process of FIGS. 5A and 5B describe the process for purchasing/obtaining a stablecoin 120 on the stablecoin blockchain system 100 and the stablecoin blockchain framework FIG. 5A illustrates an example stablecoin blockchain transaction network 500 with the stablecoin blockchain system 100 and supply chain in accordance with aspects of this invention. Each of these transactions may occur on the stablecoin blockchain transaction network 500 and the stablecoin blockchain ledger 405. First, a customer 360 may transfer cash or U.S. dollars to the stablecoin blockchain system 100 in exchange for stablecoins 120. Next, the customer may use the stablecoins 120 and transfer the stablecoins 120 in exchange for product from the dispensary 330. The dispensary 330 may then transfer stablecoins 120 in exchange for products to sell at the dispensary 330 from the processor 320. The processor 320 may then transfer stablecoins 120 in exchange for raw materials from a producer 310. The producer 310 may then transfer the stablecoins 120 in exchange for cash from the stablecoin blockchain system 100. At any point during this supply chain in the stablecoin blockchain transaction network 500, anyone of the entities, customers 360, dispensary 330, processor 320, or producer 310 may exchange their stablecoins 120 for cash from the stablecoin blockchain system 100.

Additionally, FIG. 5B illustrates a flowchart with various steps of the stablecoin blockchain transaction network 500. First, in step 510, a stablecoin purchaser will need to establish and keep open an account (respectively, a "Coin Clearing Account") which will be used: (i) to the extent applicable, to accept the cash to be used to purchase the subject stablecoin(s) 120; and (ii) to accept payment of any and all amounts to be made to such purchaser as the holder of a stablecoin 120. It is anticipated that a Coin Clearing Account may be established with any third-party bank/broker-dealer/brokerage/self-directed IRA manager/other financial intermediary that allows for the establishment of a brokerage account (or the like) and is capable of funding the purchase of assets similar to the stablecoins 120 (i.e. digital assets). Generally, the stablecoin blockchain system 100 may not be directly involved or otherwise responsible, in any manner, with respect to the formation and/or management of any Coin Clearing Account.

Second, in step 520, a stablecoin purchaser will need to establish and keep open a user account on the stablecoin blockchain framework 110 (each a "Framework Account"), the Framework Account will act as each stablecoin holder's primary interface to the stablecoin blockchain framework 110 and their respective account. Among other things, through the Framework Account a user will, among other things: (i) be able to view, in real-time, all stablecoins 120 then held by such person and all amounts owed to such person; (ii) change/modify such persons respective Coin Clearing Account information; (iii) transfer stablecoins 120 to/accept stablecoins 120 from other stablecoin blockchain framework 110 users. As discussed herein, the establishment of a Framework Account requires the satisfaction of all applicable Required Verifications by the stablecoin blockchain system 100 and the stablecoin blockchain framework 110.

A Framework Account may be completely separate and distinct from a Coin Clearing Account. The Framework Account may function similar to a typical PayPal account where a user is able to see their respective balances, send/request money etc. However, in this case the Framework Account user may be sending/requesting stablecoins 120 in lieu of cash. Further, just as a PayPal user would link an outside bank account to their PayPal account to pay/receive cash, a stablecoin blockchain framework 110 user's respective Coin Clearing Account would be linked to their respective Framework Account to pay cash for stablecoins 120 and receive cash from the stablecoins 120.

Third, in step 530, a stablecoin purchaser will need to establish and keep open a distinct cryptographic wallet/account (each a "Coin Account") on the Framework which will be used to actually hold and manage such purchaser's stablecoin(s). Additionally, there will be at least two (2) types of related Coin Account accounts; one for customers (each a "Purchaser/Customer Coin Account") and one for dispensaries and all other service-providers (each an "SP Coin Account").

Fourth, in step 540, the stablecoin purchaser/customer transfers stablecoins 120 from the Purchaser/Customer Coin Account to the service provider and the SP Coin Account in exchange for product. The service provider provides the purchaser/customer the agreed upon product (or services).

Fifth, in step 550, the service provider sells the stablecoins 120 back to the stablecoin issuer and gets cash deposited in the SP Framework Account. Lastly, in step 560, the service provider transfers the cash from the SP Framework Account to the SP Coin Clearing Account.

For the avoidance of doubt, a Coin Account may be completely separate and distinct from a Coin Clearing Account. A Coin Clearing Account may be used solely to fund the cash to acquire, and to receive any cash from, stablecoins 120 whereas the Coin Account may be used solely to hold/sell/transfer the respective purchased stablecoins 120.

Finally, once a stablecoin purchaser has fully established the above, such purchaser will be able to purchase stablecoins 120. The stablecoins 120 may be primarily purchased by retail consumers while they are at a particular dispensary and in real-time, via the POS. However, dispensaries and service providers will also be able to purchase and transfer stablecoins 120 between them via their respective Framework Account. The stablecoins 120 may only be available for sale through, and only to persons/entities who have established the above accounts/wallet on, the stablecoin blockchain framework 110.

The stablecoin blockchain transaction network 500 may provide one or more of the following advantages:

Tax Authorities may be paid via the stablecoin blockchain system 100 and the stablecoin ecosystem 300 and smart contracts. The stablecoin blockchain system 100 may pay the tax payments to the tax authorities in real-time.

Financial institutions providing banking services to these operators will be able to answer the key questions of who, what, where, and how much. The stablecoin blockchain system 100 may streamline the financial institutions AML/KYC compliance requirements and help reduce their cost, making it more profitable for them to bank this industry.

Operators—Access to traditional banking services as well as access to real-time information to address audit and compliance requirement as well as key information and data points about customers and the industry.

Regulators—Unfettered seed-to-sale transparency into this industry making it easier to oversee and regulate. Also provide state governments a pathway to utilizing blockchain for everyday operations.

STABLECOIN. The stablecoin blockchain system 100 and stablecoin blockchain framework 110 may utilize a stablecoin 120 for the stablecoin blockchain transaction network 500 that serves as the store of value or the primary medium of exchange for a highly-regulated industry, such as the legal *Cannabis* industry. The stablecoin 120 may be a store of value and medium of exchange on a blockchain-based transaction network 500. The stablecoin 120 may be an SEC security and/or an SEC-regulated security.

In general, securities sold in the U.S. must be registered. The registration forms companies file provide essential facts while minimizing the burden and expense of complying with the law. In general, registration forms call for: a description of the company's properties and business; a description of the security to be offered for sale; information about the management of the company; and financial statements certified by independent accountants. However, not all offerings of securities must be registered with the SEC. Some exemptions from the registration requirement include: private offerings to a limited number of persons or institutions; offerings of limited size; intrastate offerings; and securities of municipal, state, and federal governments.

An SEC security may be a general term defined as described above, for a security offered for sale in the U.S. The stablecoin 120 may be considered an SEC-regulated security as described and defined above or as registered or qualified and a debt or an equity. Additionally, the stablecoin 120 may be a SEC qualified stablecoin 120 that has acquired registration/qualification/exemption under the Securities Act, the Exchange Act or other applicable U.S. securities laws. The SEC qualified stablecoin may include one of: registration, qualification, or exemption under the Securities Act, the Exchange Act, or other applicable U.S. securities laws.

The stablecoin 120 may be an SEC-regulated security which enables frictionless transaction system for highly-regulated industries. The stablecoin 120 may be collateralized by U.S. dollars (or other commonly used currencies) held in escrow. Additionally, the stablecoin 120 as an SEC-regulated security may provide supply chain tracking (i.e. seed-to-sale tracking for legal *Cannabis* industry) by posting all network and system transactions to the blockchain network available to all authorized users.

Each stablecoin 120 may be issued, and all times held, in digital form only. As noted above, with respect to a particular digital asset, the respective "protocol"/stablecoin blockchain ledger protocol on which it is built essentially defines the rules and interfaces necessary to allow the subject digital asset to be bought and transferred between holders and to allow any overriding "smart contracts" to function. Put another way, the stablecoin blockchain ledger protocol essentially defines the common language that allows all of the respective components to be able to talk to, and communicate with, each other. The stablecoin blockchain ledger protocols may define the method interface (e.g. function names, parameters, and outputs) and describe the purpose of each method.

Each stablecoin 120 may utilize, and be built on, a code specifically for use on the stablecoin blockchain framework 110. Because the stablecoins 120 will only be issued/sold/transferred on and within the stablecoin blockchain framework 110, the underlying code may be built in compliance with, and within, the unique parameters of the stablecoin blockchain ledger infrastructure which will make up the stablecoin blockchain framework 110. The underlying code of the stablecoins 120 may also provide the functions of: whitelisting eligible holders, limiting issued quantities, and blocking of unauthorized transfers.

Figure 6:
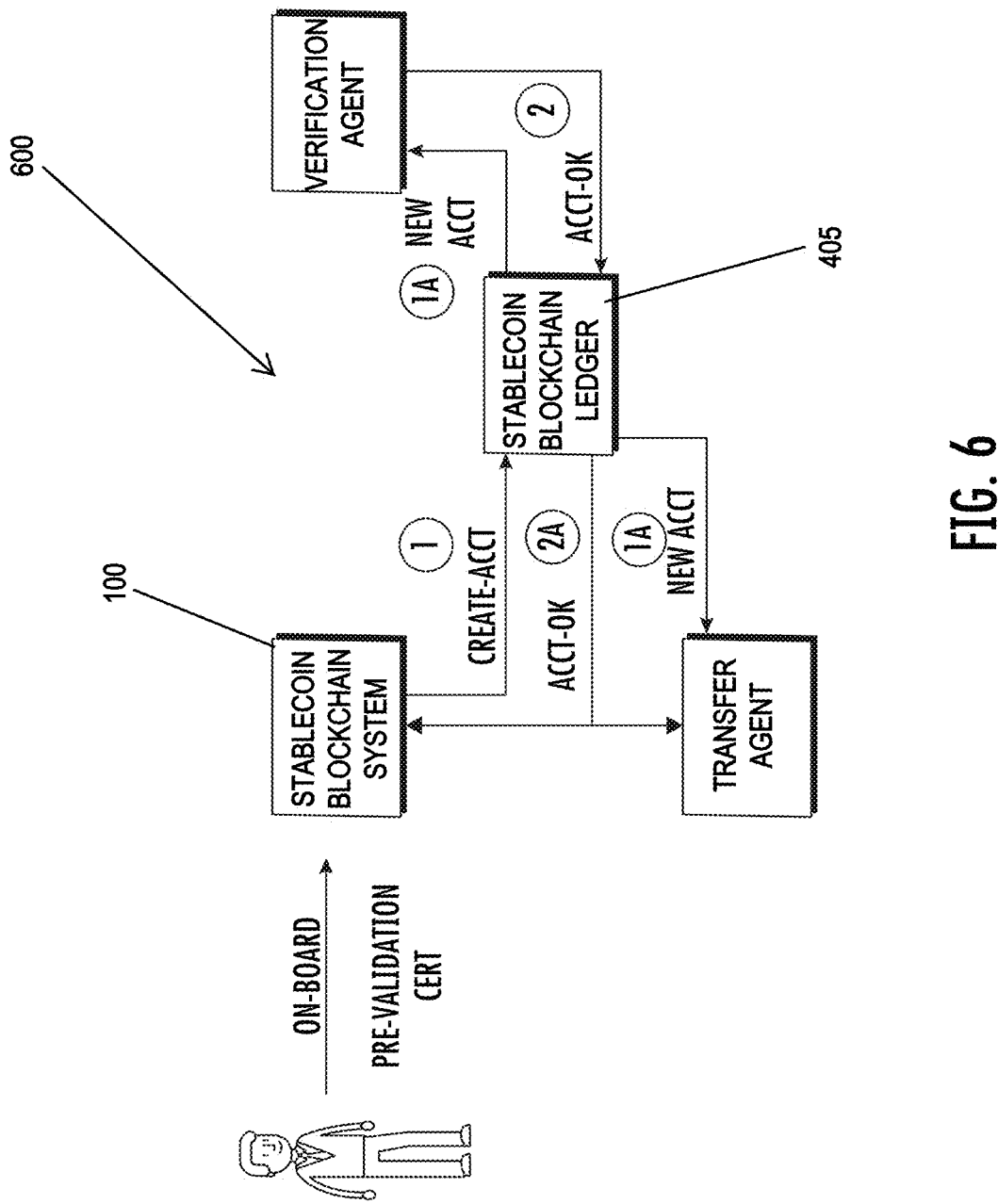
FIG. 6 is a schematic diagram of an example onboarding process for the stablecoin blockchain system according to one or more aspects described herein.

ECOSYSTEM ON-BOARDING. FIG. 6 is a schematic diagram of an example onboarding process 600 for the stablecoin blockchain system 100 according to one or more aspects described herein. As illustrated in FIG. 6, a customer may on-board with the stablecoin blockchain system 100. It may be understood that other entities from the stablecoin ecosystem 300 may on-board using a similar process with the stablecoin blockchain system 100 and as illustrated in FIG. 6.

As illustrated in FIG. 6, step 1 of the on-boarding, the stablecoin blockchain system 100 may create an account for the customer with customer information. The stablecoin blockchain system 100 may send the new customer account and customer information to the stablecoin blockchain ledger 405.

As shown in step 1A of the on-boarding in FIG. 6, the stablecoin blockchain ledger 405 sends the new customer account and customer information to a transfer agent and a verification agent. As shown in step 2, the verification agent will confirm the new customer account and customer information to the stablecoin blockchain system 100 and the stablecoin blockchain ledger 405. As shown in step 2A, the transfer agent will confirm the new customer account and customer information to the stablecoin blockchain system 100 and the stablecoin blockchain ledger 405. Following the confirmation from both the transfer agent and the verification, the stablecoin blockchain system 100 will also conduct a pre-validation certification for signature guarantee for the transfer of securities and/or stablecoins 120.

PRE-CERTIFICATION SIGNATURE GUARANTEE. The stablecoin blockchain system 100 may utilize a digital signature (certificate/stamp) as a means of transferring debt security as a stablecoin 120. The stablecoin 120 may be either an equity or debt-security. The stablecoin 120 may also be qualified or registered. During the on-boarding processing, the customer will provide a digital signature that can then be used as a pre-validation certification for the signature guarantee for a seamless real-time security transfer. The pre-validation certification may include a digital signature.

The stablecoin blockchain system 100 may include a pre-validation certification and a digital signature to provide a signature guarantee for the security transfer. The pre-validation certification and the digital signature may be confirmed during the on-boarding process. In current securities transfers, one of the cornerstones of the securities transfer function is the signature guarantee. Without such a feature, the securities industry as we know it would function only with great difficulty and with significantly higher costs. The signature guarantee is a guarantee of a person's signature, which is required by all Transfer Agents before a security transfer can take place. SEC requires that Transfer Agents adopt an equitable methodology for the acceptance of signature guarantees from eligible Guarantor institutions.

The stablecoin blockchain system 100 may include a guarantor system for providing the pre-validation certification. The guarantor system certification may have as its primary goal safety and sounding in the application of the stablecoin blockchain system 100 digital Medallion imprint and guarantee. This goal is accomplished through a well-developed awareness of the legal framework and issues, including potential Guarantor liability, when providing a signature guarantee in connection with the transfer of a security. Potential guarantor system certification training topics might include: Section 8-306 of the Uniform Commercial Code, Proper and Improper Uses of the Medallion Stamp (digital Medallion stamp); Medallion Signature Guarantee Best Practices-Know Your Customer; Best Control Practices; Safeguarding the Medallion Stamp (digital Medallion stamp); Medallion Stamp Imprinting and Verification.

When a customer receives their pre-validation certification for the guarantee signature, the stablecoin blockchain system 100 will digitally certify and validate the customer's pre-validation certification for each their stablecoin 120 transactions. Additionally, all other entities that perform transactions on the stablecoin blockchain system 100 will need to receive a pre-validation certification for the guarantee signature. Similarly, the stablecoin blockchain system 100 will digitally certify and validate any the pre-validation certification for other entities for each of their stablecoin 120 transactions.

Additionally, the on-boarding process 600 may include various required verifications. In order to subscribe to purchase a stablecoin 120, a prospective purchaser may need to satisfy one or more, or all of the applicable Required Verifications. Such Required Verifications may include, among other things: with respect to prospective purchasers who are natural persons, obtaining and verifying the name, date of birth, mailing address and taxpayer identification number of such person; with respect to prospective purchasers who are not natural persons, obtaining and verifying the legal name, principal business address, state/jurisdiction of formation, and taxpayer identification number of such entity; and where applicable, verifying whether the subject prospective purchaser is an Accredited Investor.

In addition to such other Required Verifications discussed herein, in connection with the purchase/issuance/sale of the stablecoins 120, the Required Verifications may include, among other things: with respect to any prospective stablecoin purchaser who is a service provider in the legal *Cannabis* industry, obtaining and verifying evidence that the subject purchaser is duly and fully licensed and registered by all applicable state/local authorities; and with respect to any prospective stablecoin purchaser who is a retail customer and who, pursuant to applicable law, is required to be properly licensed in order to purchase products/services, obtaining and verifying evidence that the subject purchaser is duly and fully licensed by all applicable state/local authorities.

All Required Verifications must be satisfied at the time of, and as a condition to, establishing a Framework Account. As discussed herein, Framework Accounts will be established directly via the stablecoin blockchain framework 110 and maintained by the stablecoin blockchain system 100. Accordingly, all Required Verifications in connection with the establishment of a Framework Account may be conducted directly by the stablecoin blockchain system 100 internally. Additionally, the stablecoin blockchain system 100 may engage one or more third-party consultants to manage, or otherwise assist, with the performance of such Required Verifications.

Required Customer Information. Prior to opening an account, the stablecoin blockchain system 100 may collect any the following information for all accounts, if applicable, for any person, entity or organization that is opening a new account and whose name is on the account: (1) the name; (2) date of birth (for an individual); (3) an address, which will be a residential or business street address (for an individual) or a principal place of business, local office, or other physical location (for a person other than an individual); (4) an identification number, which will be a taxpayer identification number (for U.S. persons), or one or more of the following: a taxpayer identification number, passport number and country of issuance, alien identification card number, or number and country of issuance of any other government-issued document evidencing nationality or residence and bearing a photograph or other similar safeguard (for non-U.S. persons).

The stablecoin blockchain system 100 may also perform one or more of the following: (1) Verify with the appropriate state authorities whether the business is duly licensed and registered; (2) Review the license application (and related documentation) submitted by the customer for obtaining a state license to operate the MRB; (3) Request from state licensing and enforcement authorities available information about the customer and related parties; (4) Develop an understanding of the normal and expected activity for the customer, including the types of products to be sold and the type of customers to be serviced (e.g. medical versus recreational customers); (5) Determine whether an MRB implicates one of the Cole Memo priorities or violates state law; (6) Monitor publicly available sources for adverse information about the customer and related parties; and/or (7) Refresh information obtained initially, on a periodic basis and commensurate with risk.

Verifying Information. Based on the risk, and to the extent reasonable and practicable, the stablecoin blockchain system 100 may conduct activities to confirm the true identity of the customers by using risk-based procedures to verify and document the accuracy of the information about our customers. The stablecoin blockchain system 100 may analyze the information obtained to determine whether the information is sufficient to form a reasonable belief to know the true identity of the customer (e.g., whether the information is logical or contains inconsistencies).

The stablecoin blockchain system 100 may verify customer identity through documentary means, non-documentary means or both. The stablecoin blockchain system 100 may use documents to verify customer identity when appropriate documents are available. In light of the increased instances of identity fraud, the stablecoin blockchain system 100 may supplement the use of documentary evidence by using the non-documentary means described below whenever necessary. The stablecoin blockchain system 100 may also use non-documentary means, if the stablecoin blockchain system 100 is still uncertain about whether we know the true identity of the customer. In verifying the information, the stablecoin blockchain system 100 may consider whether the identifying information received, such as the customer's name, street address, zip code, telephone number (if provided), date of birth and Social Security number, allow the stablecoin blockchain system 100 to determine with a reasonable belief the true identity of the customer (e.g., whether the information is logical or contains inconsistencies).

The stablecoin blockchain system 100 may utilize the following documents for verifying the identity of customers: for an individual, an unexpired government-issued identification evidencing nationality or residence and bearing a photograph or similar safeguard, such as a driver's license or passport; and for a person other than an individual, documents showing the existence of the entity, such as certified articles of incorporation, a government-issued business license, a partnership agreement or a trust instrument.

The stablecoin blockchain system 100 may rely on a government-issued identification as verification of a customer's identity. If, however, the stablecoin blockchain system 100 notes that the document shows some obvious form of fraud, the stablecoin blockchain system 100 may consider that factor in determining a reasonable belief of the customer's true identity.

The stablecoin blockchain system 100 may use the following non-documentary methods of verifying identity: independently verifying the customer's identity through the comparison of information provided by the customer with information obtained from a consumer reporting agency, public database or other source [identify reporting agency, database, etc.]; checking references with other financial institutions; or obtaining a financial statement.

The stablecoin blockchain system 100 may use non-documentary methods of verification when: the customer is unable to present an unexpired government-issued identification document with a photograph or other similar safeguard; the stablecoin blockchain system 100 is unfamiliar with the documents the customer presents for identification verification; the customer and the stablecoin blockchain system 100 do not have previous or face-to-face contact; and there are other circumstances that increase the risk that the stablecoin blockchain system 100 will be unable to verify the true identity of the customer through documentary means.

The stablecoin blockchain system 100 may verify the information within a reasonable time before or after the account is opened. Depending on the nature of the account and requested transactions, the stablecoin blockchain system 100 may refuse to complete a transaction before the stablecoin blockchain system 100 has verified the information. In some instances when the stablecoin blockchain system 100 may need more time, the stablecoin blockchain system 100 may, pending verification, restrict the types of transactions or dollar amount of transactions. If the stablecoin blockchain system 100 finds suspicious information that indicates possible money laundering, terrorist financing activity, or other suspicious activity, the stablecoin blockchain system 100 may automatically file a SAR in accordance with applicable laws and regulations.

The stablecoin blockchain system 100 may recognize that the risk of not confirming the customer's true identity may be heightened for certain types of accounts, such as an account opened in the name of a corporation, partnership or trust that is created or conducts substantial business in a jurisdiction that has been designated by the U.S. as a primary money laundering jurisdiction, a terrorist concern, or has been designated as a non-cooperative country or territory. The stablecoin blockchain system 100 may identify those customers that pose a heightened risk of not being properly identified. The stablecoin blockchain system 100 may also take the following additional measures that may be used to obtain information about the identity of the individuals associated with the customer when standard documentary methods prove to be insufficient.

Lack of Verification. When the stablecoin blockchain system 100 cannot form a reasonable belief of the true identity of a customer, the stablecoin blockchain system 100 may do the following: (1) not open an account; (2) impose terms under which a customer may conduct transactions while the stablecoin blockchain system 100 attempts to verify the customer's identity; (3) close an account after attempts to verify a customer's identity fail; and (4) determine whether it is necessary to file a SAR in accordance with applicable laws and regulations.

Recordkeeping. The stablecoin blockchain system 100 may document the verification, including all identifying information provided by a customer, the methods used and results of verification, and the resolution of any discrepancies identified in the verification process. The stablecoin blockchain system 100 will keep records containing a description of any document that was relied on to verify a customer's identity, noting the type of document, any identification number contained in the document, the place of issuance, and if any, the date of issuance and expiration date. With respect to non-documentary verification, the stablecoin blockchain system 100 may retain documents that describe the methods and the results of any measures to verify the identity of a customer. The stablecoin blockchain system 100 may also keep records containing a description of the resolution of each substantive discrepancy discovered when verifying the identifying information obtained. The stablecoin blockchain system 100 may retain records of all identification information for five years after the account has been closed; the stablecoin blockchain system 100 may retain records made about verification of the customer's identity for five years after the record is made.

Comparison with Government-Provided Lists of Terrorists. At such time as we receive notice that a federal government agency has issued a list of known or suspected terrorists and identified the list as a list for CIP purposes, the stablecoin blockchain system 100 may, within a reasonable period of time after an account is opened (or earlier, if required by another federal law or regulation or federal directive issued in connection with an applicable list), determine whether a customer appears on any such list of known or suspected terrorists or terrorist organizations issued by any federal government agency and designated as such by Treasury in consultation with the federal functional regulators.

Identification and Verification of Beneficial Owners. At the time of opening an account for a legal entity customer, the individual or primary account holder for an entity, will identify any individual that is a beneficial owner of the legal entity customer by identifying any individuals who directly or indirectly own 25% or more of the equity interests of the legal entity customer, and any individual with significant responsibility to control, manage, or direct a legal entity customer. The following information will be collected for each beneficial owner: (1) the name; (2) date of birth (for an individual); (3) an address, which will be a residential or business street address (for an individual); and (4) an identification number, which will be a Social Security number (for U.S. persons), or one or more of the following: a passport number and country of issuance, or other similar identification number, such as an alien identification card number, or number and country of issuance of any other government-issued document evidencing nationality or residence and bearing a photograph or other similar safeguard (for non-U.S. persons).

For verification, the stablecoin blockchain system 100 may describe any document relied on (noting the type, any identification number, place of issuance and, if any, date of issuance and expiration). The stablecoin blockchain system 100 may also describe any non-documentary methods and the results of any measures undertaken.

Understanding the Nature and Purpose of Customer Relationships. The stablecoin blockchain system 100 will understand the nature and purpose of customer relationships for the purpose of developing a customer risk profile.

Depending on the facts and circumstances, the stablecoin blockchain system 100 may utilize the following information for a customer risk profile: the type of customer; the customer's income; the customer's net worth; the customer's domicile; the customer's principal occupation or business; in the case of existing customers, the customer's history of activity; status of state issued marijuana business license; fines, penalties, or punishments for marijuana operating business; an understanding of the normal and expected activity for the business, including the types of products to be sold and the type of customers to be served (e.g., medical versus recreational customers); ongoing monitoring of publicly available sources for adverse information about the business and related parties. Additionally, the stablecoin blockchain system 100 may verify with the appropriate state authorities whether the business is duly licensed and registered and/or request from state licensing and enforcement authorities available information about the business and related parties.

TRANSACTION. FIGS. 5A, 5B, 7, and 8 illustrate various embodiments of a proposed method and flow for a transactional stablecoin 120 usage and trading with the stablecoin blockchain system 100. As discussed herein, all users (i.e. customers, dispensaries/other service-providers, etc.) who will be buying/accepting stablecoins 120 may be required, among other things, to set up a distinct Coin Account on the Framework (as described above in On-Boarding). Further, there will be at least two (2) types of related Coin Account accounts; a Purchaser Coin Account for customers and a SP Coin Account for dispensaries and all other service-providers.

Once a stablecoin purchaser has fully established the above, such purchaser will be able to purchase stablecoins

120. The stablecoins 120 may be primarily purchased by retail consumers while they are at a particular dispensary and in real-time. However, dispensaries and service providers will also be able to purchase and transfer stablecoins 120 between them via their respective Framework Account.

Figure 7:
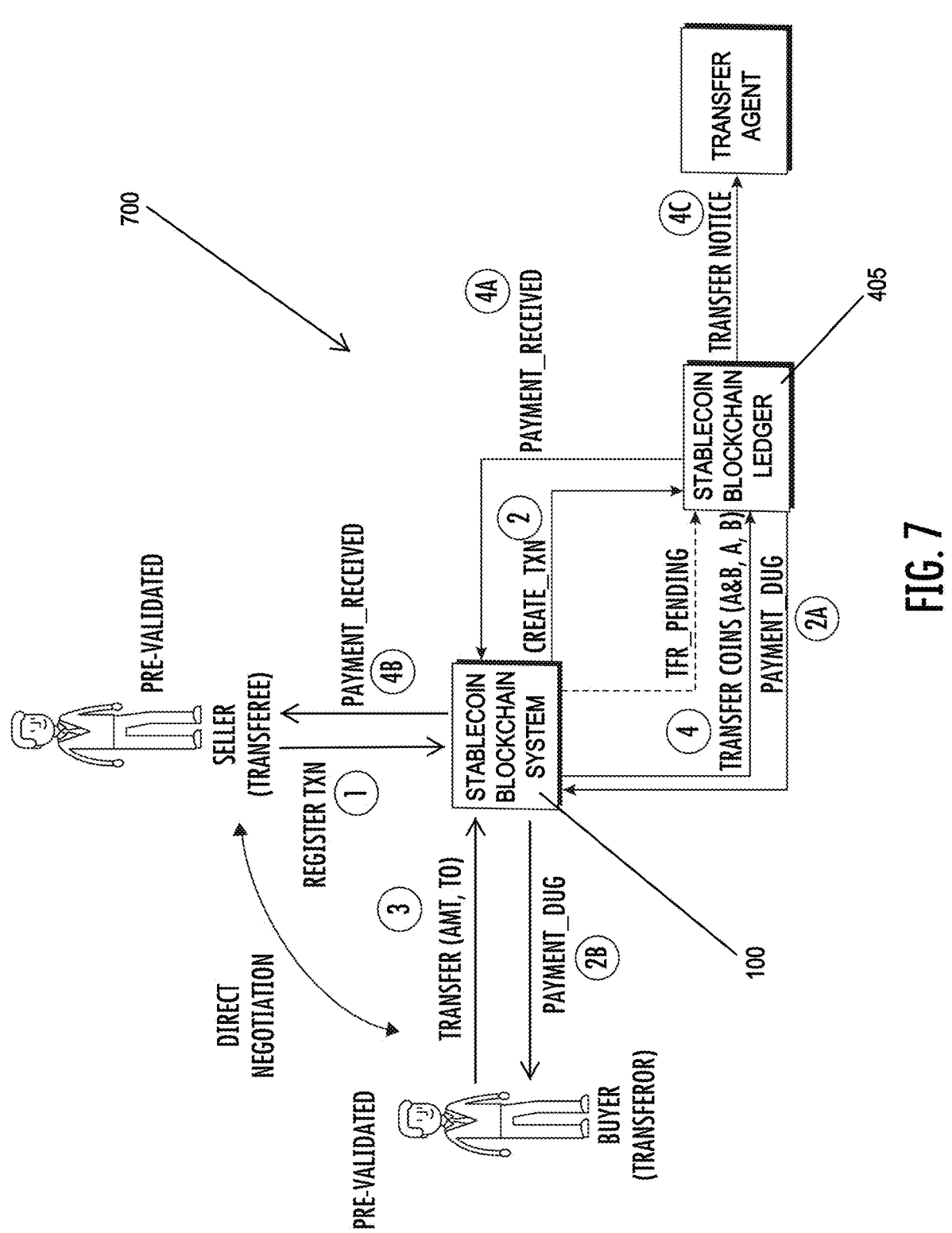
FIG. 7 is a schematic diagram of an example transaction flow for the stablecoin blockchain system according to one or more aspects described herein.
Figure 8:
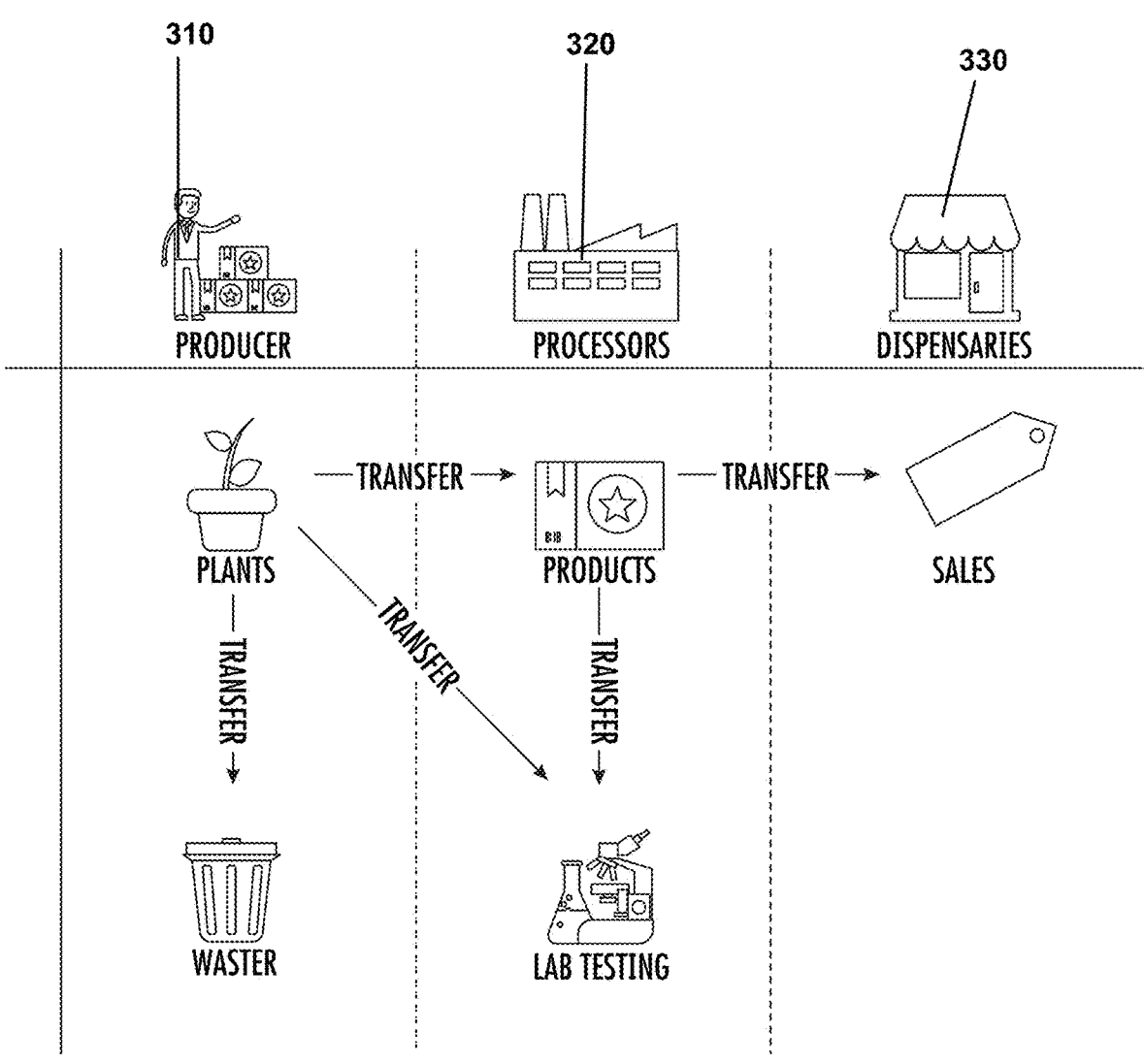
FIG. 8 is a schematic diagram of an example transaction flow for the stablecoin blockchain system according to one or more aspects described herein.

FIG. 7 is a schematic diagram of an example transaction flow for the stablecoin blockchain system according to one or more aspects described herein. FIG. 7 illustrates a flowchart for obtaining a stablecoin 120 on the stablecoin blockchain system 100 and the stablecoin blockchain framework 110 between the seller (transferee) and the buyer (transferor). The buyer and the seller will conduct a direct negotiation for a purchase price for a product. The buyer and the seller may hold a pre-validated certification for a signature guarantee for the transfer of a security or stablecoin 120.

In step 1, the seller may first register the transaction within the stablecoin blockchain system 100. The registration of the transaction may include transaction information of transfer type, product transferred, transfer price, transfer date, etc. In step 2, the stablecoin blockchain system 100 may create and post the transaction within the stablecoin blockchain ledger 405. In step 2A, the stablecoin blockchain ledger 405 may send the payment request for the transaction to the stablecoin blockchain system 100. In step 2B, the stablecoin blockchain system 100 may send the payment request for the transaction to the buyer for payment.

In step 3, the buyer may then transfer in stablecoins 120 for the transaction through the stablecoin blockchain system 100 and the stablecoin blockchain transaction network 500 the transaction amount.

In step 4, the stablecoin blockchain system 100 may then transfer and post the transfer of the stablecoins 120 for the transaction in the stablecoin blockchain ledger 405. In step 4A, the stablecoin blockchain ledger 405 may then send confirmation of the payment received for the transaction to the stablecoin blockchain system 100. At step 4B, the stablecoin blockchain system 100 may then send the payment for the transaction, either in cash or stablecoins 120, to the seller. Lastly, in step 4C, the stablecoin blockchain ledger 405 may send confirmation of the transfer notice to the transfer agent for the transaction.

Description of Customer to Service Provider Transactions:

Each retail customer will be required to purchase stablecoins 120 directly from the stablecoin blockchain system 100 which they will then give to the participating dispensary/service-provider for goods and services. Both the initial purchase of stablecoins 120 from the stablecoin blockchain system 100, and any subsequent transfer of stablecoins 120 may also include a payment of a Transaction Fee.

The foregoing purchase/transfer transactions, including the payment of all applicable Transaction Fees, will occur via a point-of-sale interface (the "POS"). It is intended that the POS will be structured as a compatible, software based, add-on/interface (e.g. Application Programming Interface (API)) to existing point-of-sale terminals currently being used by service providers in the legal *Cannabis* industry. Accordingly, the stablecoin blockchain system 100 may communicate and connect to a third-party, point-of-sale service providers within the legal *Cannabis* industry in order to program its POS to ensure compatibility with their existing products.

Regardless of its ultimate form, the POS will be linked directly to the Framework and will allow customers to use credit/debit cards to pay for goods and services. That being said, instead of being a simple transfer of cash from the purchaser's credit/debit account to the service provider, the POS will, seamlessly and in real-time, allow the purchaser to purchase stablecoins 120 from the stablecoin blockchain system 100 and trade such stablecoins 120 to the dispensary/service-provider for goods and services. From the customer's prospective and other than being required to have set up a Purchaser Coin Account and other related accounts prior to purchasing goods, the transaction process should occur seamlessly and in substantively the same manner as if they had paid for the subject goods by any other method.

By way of example, assuming a retail *Cannabis* customer (such customer, who has already established a Purchaser Coin Account and all other required accounts, being "Customer A") desires to purchase $50 worth of product from a dispensary (such dispensary, who has already established an SP Coin Account and all other required accounts, being "Dispensary X"), the transaction would proceed as follows:

Customer Side: Customer A would purchase stablecoins 120 directly from the stablecoin blockchain system 100 using the POS at the respective dispensary. The POS would allow Customer A (automatically via the POS back-end operations) to use their credit/debit card to acquire stablecoins 120 directly from the stablecoin blockchain system 100 and to pay the requisite Transaction Fees. Accordingly, continuing with the given example, Customer A would pay $50 plus, a Transaction Fee, to acquire $50 worth of stablecoins 120. Said $50 worth of stablecoins 120 would be credited to the Purchaser Coin Account of Customer A and subsequently transferred to the SP Coin Account of Dispensary X.

Dispensary Side: $50 worth of stablecoins 120 will be transferred to the SP Coin Account of Dispensary X in exchange for the provided goods and services. The stablecoin blockchain system 100 may also automatically provide and distribute any potential tax payments to state or federal tax authorities based on this transaction as required/needed.

For the avoidance of doubt, in the subject example Customer A would pay a total of $50+transaction fee to acquire, and to transfer to Dispensary X, $50 worth of stablecoins 120. Put another way, in the above example it would cost Customer A $50+transaction fees to acquire $50 worth of goods/services from Dispensary X.

It should also be noted again that the above transactions will all be handled automatically via the stablecoin blockchain system 100 and POS back-end operations. From the perspective of Customer A and Dispensary X, the above transactions will occur automatically, and in real-time, as the subject sale is made/service is provided. Additionally, in connection with any required refund from a dispensary to a retail customer: (i) the foregoing transactions, including the payment of the applicable Transaction Fees, will be fully reversed; and (ii) no additional Transaction Fee will be charged in connection with the reversing transfer of stablecoins 120 from the subject dispensary to the respective customer.

Description of Service Provider to Service Provider Transactions:

Any dispensary or other service provider who holds stablecoins 120 in its SP Coin Account (or otherwise acquires stablecoins 120 from the stablecoin blockchain system 100) will be free to trade, or otherwise transfer, such stablecoins 120 to any other dispensary/service provider who then has an active SP Coin Account. Each such transfer may be initiated, and completed, solely via the stablecoin blockchain framework 110 and the stablecoin blockchain system 100 (via such transferring service providers respective Framework Account). Further, in connection with each such transfer, the transferring dispensary/service provider may be required to pay an applicable Transaction Fee.

By way of example, assuming Dispensary X in the above example, who acquired $50 worth of stablecoins 120, desires to transfer $30 worth of such stablecoins 120 to a third-party service provider (such service provider, who has already established an SP Coin Account and all other required accounts, being the "Third-Party Provider") in payment for certain products/services rendered.

Dispensary X Side: Dispensary X will, via its respective Framework Account, initiate the transfer of $30 worth of the stablecoins 120 then held in Dispensary X's SP Coin Account to the Third-Party Provider. The stablecoin blockchain framework 110 will cause the transfer of the subject $30 worth of the stablecoins 120 to the Third-Party Provider as well as the payment of a $0.15 Transaction Fee (being $30×$0.005) to the stablecoin blockchain system 100. Accordingly, for recording purposes: (i) said $30 worth of stablecoins 120 will be transferred to the SP Coin Account of the Third-Party Provider; and (ii) $0.15 worth of stablecoins 120 will be transferred back to the stablecoin blockchain system 100 as payment for the Transaction Fee, resulting in $19.85 worth of stablecoins 120 then remaining in Dispensary X's SP Coin Account (being the initial $50 worth of stablecoins 120 in Dispensary X's SP Coin Account, less the $30 in stablecoins 120 transferred to the Third-Party Provider and less the $0.15 Transaction Fee). The stablecoin blockchain system 100 may also automatically provide and distribute any potential tax payments to state or federal tax authorities based on this transaction as required/needed.

Third-Party Provider: Third-Party Provider will accept the aforementioned $30 worth of stablecoins 120 from Dispensary X in consideration for the respective products/services rendered.

For the avoidance of doubt, a service provider will be able to purchase stablecoins 120 directly from the stablecoin blockchain system 100 via their respective Framework Account and subsequently transfer those stablecoins 120 to any other dispensary/service provider who then has an active SP Coin Account.

In another embodiment of the stablecoin blockchain system 100, certain acquisitions/transfers of stablecoins may require a payment of a small transaction fee.

AUDITING/TAXES. Additionally, the methods and systems of the present invention will help regulators regulate any highly-regulated industry. The methods and systems of the present invention may help stop money laundering and other illicit payments in the systems. The methods and systems of the present invention may provide an automated suspicious activity reports (SARs) and other regulatory filings based on the transaction log throughout the process. The methods and systems of the present invention may provide automated auditing reports for all transactions within the system.

The methods and systems of the present invention may help with capturing tax revenue in these highly-regulated industries. States with legalized *Cannabis* sales, such as Illinois and California, may be worried about missing at on Tax revenue. The systems and methods, using the stablecoin blockchain system 100, the stablecoin blockchain framework 110, and the blockchain distributed ledger 405, according to this invention, may track all transactions, and therefore create automatic payments for taxes to the states or IRS from the supply chain.

Additionally, the stablecoin 120 may allow for real-time remittance of all taxes and fees while providing real-time data and analytics to all interested and authorized users.

Because the stablecoin 120 is a regulated security, it can easily be used for universal transactions.

Additionally, the stablecoin blockchain system 100 and the stablecoin blockchain framework 110 with related blockchain technology may provide financial institutions with mainstream banking services as the stablecoin blockchain system 100 reduces AML/KYC and other compliance costs. Additionally, *Cannabis* operators will be able to access traditional banking services as all transactions will be tracked using the stablecoin 120 and Banks can identify to the penny the origin of each and every transaction. Lastly, State and Federal Regulators may have unfettered transparency providing for easier compliance and regulatory oversight.

FRAUD/SAR. Blockchain technology presents a novel mechanism for decentralizing the processing and validation of digital transactions through the creation of open, unpermissioned networks of computer nodes. While promising, current fully-decentralized, unpermissioned network implementations have struggled to scale as transaction volume has increased.

The stablecoin blockchain transaction network 500 may provide one such example of how analysis of the participants and their economic interests can be used to tune the parameters of a blockchain network implementation in order to best balance scalability, throughput, and stability.

Collusion between dispensary and producer/processor may be uncovered through the stablecoin blockchain system 100 and the stablecoin blockchain framework 110 and with audit visits by the regulator and show product that did not exist. Collusion between the dispensary and regulator may be uncovered through the stablecoin blockchain system 100 and the stablecoin blockchain framework 110 by the failure to receive payment by the producer/processor. Collusion between the producer/processor and regulator may be uncovered through the stablecoin blockchain system 100 and the stablecoin blockchain framework 110 by the failure to receive product by the dispensary.

Dispensaries. Dispensary records must match with regulatory reports, and also be consistent with reports submitted by Producer/Processors. Fraudulent transactions would fail this test and result in rapid revocation of the dispensary's license. In addition, transfer of "false" funds to producer/processor would result in loss of value for the recipient. Any dispensary acting in this manner would find themselves without a source of product.

Producer/Processors. Producer/Processor records must match with regulatory reports, and also be consistent with reports submitted by dispensaries. Fraudulent transactions would fail this test and result in rapid revocation of the producer/processor license. In addition, since banking services are dependent on compliance with regulatory requirements, entities engaging in fraudulent activity would find their assets frozen and their access to future banking services curtailed.

Regulators. Regulators receive no direct financial benefit from transactions and therefore have no incentive to engage in fraudulent activity as there is no gain.

The question can fairly be raised as to whether collusion between two of the associated parties might allow for fraudulent transactions to be processed without detection, but in review, ALL THREE external participants (the dispensary, producer/processor, and regulator) would need to collude to accomplish this. It is highly unlikely that the regulator tasked with oversight of this market would elect to be a bad actor, but even in that case, all three parties would need to collaborate, and if they did, the stablecoin blockchain system 100 and the stablecoin blockchain framework 110 would still be able to detect the fraudulent transaction due to lack of initial retail customer activity.

In addition to the information the stablecoin blockchain system 100 may collect under Federal and State rules and the stablecoin blockchain system 100 may establish, document, and maintain a written Customer Identification Program (CIP). The stablecoin blockchain system 100 may collect certain minimum customer identification information from each customer who opens an account; utilize risk-based measures to verify the identity of each customer who opens an account; record customer identification information and the verification methods and results; provide the required adequate CIP notice to customers that stablecoin blockchain system 100 will seek identification information to verify their identities; and compare customer identification information with government-provided lists of suspected terrorists, once such lists have been issued by the government.

The stablecoin blockchain system 100 may also collect certain minimum Customer Due Diligence (CDD) information from beneficial owners of legal entity customers. The stablecoin blockchain system 100 may understand the nature and purpose of customer relationships for the purpose of developing a customer risk profile. The stablecoin blockchain system 100 may conduct ongoing monitoring to identify and report suspicious transactions, and, on a risk basis, maintain and update customer information.

Additionally, the stablecoin blockchain system 100 will monitor accounts for suspicious activity. The stablecoin blockchain system 100 may automatically file Suspicious Activity Reports (SAR) for both marijuana and non-marijuana related suspicious activity as required. In additional to SARs, the stablecoin blockchain system 100 may file Currency Transaction Reports (CTR) and Currency and Monetary Instrument Transportation Reports (CMIR) as required, requested or needed. The stablecoin blockchain system 100 may monitor account activity for suspicious activity, specifically monitoring for unusual size, volume, pattern or type of transactions, considering risk factors and red flags that are appropriate to the business.

Red Flags. Red flags that signal possible money laundering or terrorist financing include, but are not limited to one or more of the following:

Customers—Insufficient or Suspicious Information: provides unusual or suspicious identification documents that cannot be readily verified; reluctant to provide complete information about nature and purpose of business, prior banking relationships, anticipated account activity, officers and directors or business location; refuses to identify a legitimate source for funds or information is false, misleading or substantially incorrect; background is questionable or differs from expectations based on business activities; or customer with no discernable reason for using the stablecoin blockchain system 100.

Efforts to Avoid Reporting and Recordkeeping: reluctant to provide information needed to file reports or fails to proceed with transaction; tries to persuade an employee not to file required reports or not to maintain required records; "structures" deposits, withdrawals or purchase of monetary instruments below a certain amount to avoid reporting or recordkeeping requirements; or unusual concern with the compliance with government reporting requirements and AML policies.

Certain Funds Transfer Activities: wire transfers to/from financial secrecy havens or high-risk geographic location without an apparent business reason; many small, incoming wire transfers or deposits made using checks and money orders and almost immediately withdrawn or wired out in manner inconsistent with customer's business or history—may indicate a Ponzi scheme; or wire activity that is unexplained, repetitive, unusually large or shows unusual patterns or with no apparent business purpose.

Certain Deposits or Dispositions of Physical Certificates: physical certificate is titled differently than the account; physical certificate does not bear a restrictive legend, but based on history of the stock and/or volume of shares trading, it should have such a legend; customer's explanation of how he or she acquired the certificate does not make sense or changes; or customer deposits the certificate with a request to journal the shares to multiple accounts, or to sell or otherwise transfer ownership of the shares;

Certain Securities Transactions: customer engages in pre-arranged or other non-competitive trading, including wash or cross trades of illiquid securities; two or more accounts trade an illiquid stock suddenly and simultaneously; customer journals securities between unrelated accounts for no apparent business reason; customer has opened multiple accounts with the same beneficial owners or controlling parties for no apparent business reason; customer transactions include a pattern of receiving stock in physical form or the incoming transfer of shares, selling the position and wiring out proceeds; or customer's trading patterns suggest that he or she may have inside information.

Transactions Involving Penny Stock Companies: company has no business, no revenues and no product; company has experienced frequent or continuous changes in its business structure; officers or insiders of the issuer are associated with multiple penny stock issuers; company undergoes frequent material changes in business strategy or its line of business; officers or insiders of the issuer have a history of securities violations; company has not made disclosures in SEC or other regulatory filings; or company has been the subject of a prior trading suspension.

Transactions Involving Insurance Products: cancels an insurance contract and directs funds to a third party; structures withdrawals of funds following deposits of insurance annuity checks signaling an effort to avoid BSA reporting requirements; rapidly withdraws funds shortly after a deposit of a large insurance check when the purpose of the fund withdrawal cannot be determined; cancels annuity products within the free look period which, although could be legitimate, may signal a method of laundering funds if accompanied with other suspicious indicia; opens and closes accounts with one insurance company then reopens a new account shortly thereafter with the same insurance company, each time with new ownership information; purchases an insurance product with no concern for investment objective or performance; or purchases an insurance product with unknown or unverifiable sources of funds, such as cash, official checks or sequentially numbered money orders.

Activity Inconsistent with Business: transactions patterns show a sudden change inconsistent with normal activities; unusual transfers of funds or journal entries among accounts without any apparent business purpose; maintains multiple accounts, or maintains accounts in the names of family members or corporate entities with no apparent business or other purpose; or appears to be acting as an agent for an undisclosed principal, but is reluctant to provide information.

Other Suspicious Customer Activity: unexplained high level of account activity with very low levels of securities transactions; funds deposits for purchase of a long-term investment followed shortly by a request to liquidate the position and transfer the proceeds out of the account; law enforcement subpoenas; large numbers of securities trans-
actions across a number of jurisdictions; buying and selling
securities with no purpose or in unusual circumstances;
payment by third-party check or money transfer without an
apparent connection to the customer; payments to third-
party without apparent connection to customer; or no con-
cern regarding the cost of transactions or fees (i.e., surrender
fees, higher than necessary commissions, etc.).

Red Flags to Distinguish Priority SARs. The following
red flags indicate that a marijuana-related business may be
engaged in fraudulent activity that violates federal or state
law. These red flags indicate only possible signs of such
activity, and also do not constitute an exhaustive list. It is
thus important to view any red flag(s) in the context of other
indicators and facts, such as the financial institution's
knowledge about the underlying parties obtained through its
customer due diligence. Further, the presence of any of these
red flags in a given transaction or business arrangement may
indicate a need for additional due diligence, which could
include seeking information from other involved financial
institutions. These red flags are based primarily upon
schemes and typologies described in SARs or identified by
our law enforcement and regulatory partners, and may be
updated in future guidance.

In an embodiment of the present invention, the stablecoin
blockchain system 100 may identify a fraudulent situation
and automatically file a SAR for a customer that may appear
to be using a state-licensed marijuana-related business as a
front or pretext to launder money derived from other crimi-
nal activity (i.e., not related to marijuana) or derived from
marijuana-related activity not permitted under state law.
Relevant indicia could include: the business receives sub-
stantially more revenue than may reasonably be expected
given the relevant limitations imposed by the state in which
it operates; the business receives substantially more revenue
than its local competitors or than might be expected given
the population demographics; the business is depositing
more cash than is commensurate with the amount of mari-
juana-related revenue it is reporting for federal and state tax
purposes; the business is unable to demonstrate that its
revenue is derived exclusively from the sale of marijuana in
compliance with state law, as opposed to revenue derived
from (i) the sale of other illicit drugs, (ii) the sale of
marijuana not in compliance with state law, or (iii) other
illegal activity; the business makes cash deposits or with-
drawals over a short period of time that are excessive
relative to local competitors or the expected activity of the
business; deposits apparently structured to avoid Currency
Transaction Report ("CTR") requirements; rapid movement
of funds, such as cash deposits followed by immediate cash
withdrawals; deposits by third parties with no apparent
connection to the accountholder; excessive commingling of
funds with the personal account of the business's owner(s)
or manager(s), or with accounts of seemingly unrelated
businesses; individuals conducting transactions for the busi-
ness appear to be acting on behalf of other, undisclosed
parties of interest; financial statements provided by the
business to the financial institution are inconsistent with
actual account activity; surge in activity by third parties
offering goods or services to marijuana-related businesses,
such as equipment suppliers or shipping servicers; the
business is unable to produce satisfactory documentation or
evidence to demonstrate that it is duly licensed and operat-
ing consistently with state law; the business is unable to
demonstrate the legitimate source of significant outside
investments.

In an embodiment of the present invention, the stablecoin
blockchain system 100 may identify a fraudulent situation
and automatically file a SAR when a customer seeks to
conceal or disguise involvement in marijuana-related busi-
ness activity. For example, the customer may be using a
business with a non-descript name (e.g., a "consulting,"
"holding," or "management" company) that purports to
engage in commercial activity unrelated to marijuana, but is
depositing cash that smells like marijuana.

In an embodiment of the present invention, the stablecoin
blockchain system 100 may identify a fraudulent situation
and automatically file a SAR when review of publicly
available sources and databases about the business, its
owner(s), manager(s), or other related parties, reveal nega-
tive information, such as a criminal record, involvement in
the illegal purchase or sale of drugs, violence, or other
potential connections to illicit activity.

In an embodiment of the present invention, the stablecoin
blockchain system 100 may identify a fraudulent situation
and automatically file a SAR when the business, its
owner(s), manager(s), or other related parties are, or have
been, subject to an enforcement action by the state or local
authorities responsible for administering or enforcing mari-
juana-related laws or regulations.

In an embodiment of the present invention, the stablecoin
blockchain system 100 may identify a fraudulent situation
and automatically file a SAR when a marijuana-related
business engages in international or interstate activity,
including by receiving cash deposits from locations outside
the state in which the business operates, making or receiving
frequent or large interstate transfers, or otherwise transact-
ing with persons or entities located in different states or
countries.

In an embodiment of the present invention, the stablecoin
blockchain system 100 may identify a fraudulent situation
and automatically file a SAR when the owner(s) or
manager(s) of a marijuana-related business reside outside
the state in which the business is located.

In an embodiment of the present invention, the stablecoin
blockchain system 100 may identify a fraudulent situation
and automatically file a SAR when a marijuana-related
business is located on federal property or the marijuana sold
by the business was grown on federal property.

In an embodiment of the present invention, the stablecoin
blockchain system 100 may identify a fraudulent situation
and automatically file a SAR when a marijuana-related
business's proximity to a school is not compliant with state
law.

In an embodiment of the present invention, the stablecoin
blockchain system 100 may identify a fraudulent situation
and automatically file a SAR when a marijuana-related
business purporting to be a "non-profit" is engaged in
commercial activity inconsistent with that classification, or
is making excessive payments to its manager(s) or
employee(s).

The stablecoin blockchain system 100 may automatically
file SARs with FinCEN for any transactions (including
deposits and transfers) conducted or attempted by, at or
through stablecoin blockchain system 100 involving $5,000
or more of funds or assets (either individually or in the
aggregate) where the stablecoin blockchain system 100 has
determined, knows, suspects or has reason to suspect: the
transaction involves funds derived from illegal activity or is
intended or conducted in order to hide or disguise funds or
assets derived from illegal activity as part of a plan to violate
or evade federal law or regulation or to avoid any transaction
reporting requirement under federal law or regulation; the transaction is designed, whether through structuring or otherwise, to evade any requirements of the BSA regulations; the transaction has no business or apparent lawful purpose or is not the sort in which the customer would normally be expected to engage, and after examining the background, possible purpose of the transaction and other facts, we know of no reasonable explanation for the transaction; or the transaction involves the use of the stablecoin blockchain system 100 to facilitate criminal activity.

The stablecoin blockchain system 100 may also automatically file a SAR and notify the appropriate law enforcement authority in situations involving violations that require immediate attention, such as terrorist financing or ongoing money laundering schemes. In addition, stablecoin blockchain system 100 may contact the SEC in cases where a SAR we have filed may require immediate attention by the SEC.

The stablecoin blockchain system 100 may also automatically file a voluntary SAR for any suspicious transaction that stablecoin blockchain system 100 determines is relevant to the possible violation of any law or regulation but that is not required to be reported under the SAR rule.

Currency Transaction Reports. The stablecoin blockchain system 100 may prohibit transactions involving currency and has the following procedures to prevent such transactions. If the stablecoin blockchain system 100 discovers such transactions have occurred, the stablecoin blockchain system 100 may file with FinCEN CTRs for currency transactions that exceed $10,000. Also, the stablecoin blockchain system 100 may treat multiple transactions involving currency as a single transaction for purposes of determining whether to file a CTR if they total more than $10,000 and are made by or on behalf of the same person during any one business day.

Currency and Monetary Instrument Transportation Reports. A currency and monetary instrument transportation report (CMIR) must be filed whenever more than $10,000 in currency or other monetary instruments is physically transported, mailed or shipped into or from the United States. A CMIR also must be filed whenever a person receives more than $10,000 in currency or other monetary instruments that has been physically transported, mailed or shipped from outside the United States and a CMIR has not already been filed with respect to the currency or other monetary instruments received.

TRACKING TRANSACTIONS/SUPPLY CHAIN. The stablecoin blockchain system 100 and stablecoin blockchain framework 110 provides an ideal mechanism in which the U.S. *Cannabis* industry can transparently capture the history of *Cannabis* through the entire supply chain, ultimately ensuring consumer safety while exerting regulatory control from seed to sale.

Additionally, the stablecoin blockchain system 100 and stablecoin blockchain framework 110 may include chain of custody tracking for every transaction with security-backed stablecoin 120 throughout the process—from dispensary to final purchase. In another embodiment, the stablecoin blockchain system 100 and stablecoin blockchain framework 110 may include further chain of custody tracking for every transaction with the security-backed stablecoin 120 throughout the process—from "seed-to-sale," meaning from initial growing and planting of the seed to the final sale/purchase by the consumer and user of the *Cannabis*. This chain of custody tracking may tie into product recalls and/or federal transactional auditing.

Seed-To-Sale Tracking. Processors and regulators see the benefits of greater visibility, which in turn leads to optimization, improved reconciliation, greater auditability and regulatory compliance. Due to the primarily all cash nature of the legal *Cannabis* industry, transparency and accurate tracking of payments, profits, taxes, and product becomes very difficult, if not impossible. Blockchain differentiates by addressing requirements for both product traceability and identity management. The blockchain shared ledger 405 may be updated and validated in real-time with each network participant. The real-time updating of the blockchain shared ledger 405 enables equal visibility of activities and reveals where an asset/product is at any point in time, who owns it and what condition or state it is in. This type of transparency would bring a new level of visibility and control to the local regulators and provide assurance to the multitude of cautious stakeholders regarding the way the management of a *Cannabis* supply chain is rolled out within the state.

Additionally, the stablecoin blockchain system 100 and stablecoin blockchain framework 110 may assist producers with real-time inventory management, greater projections of supply and demand, and elicit trends of consumption through data analytics.

Using the specific supply chain tracking and chain of custody of the supply chain for the final products on the blockchain shared ledger 405, the stablecoin blockchain system 100 may text and/or communicate with the customers, dispensaries, or processors about any product recalls or chemical recalls. Using the specific supply chain tracking and chain of custody of the supply chain for the final products on the blockchain shared ledger 405, the stablecoin blockchain system 100 will know the transactions associated with a specific product recall. The stablecoin blockchain system 100 may then track these transactions back to the specific customers, dispensaries, or processors to communicate with those customers, dispensaries, or processors to take the appropriate action based on the product recall.

Additionally, if the stablecoin blockchain system 100 is utilized throughout the entire supply chain, the stablecoin blockchain system 100 will be able to track any product recall, chemical analysis, or component recall to the final product and therefore to the final customer and/or dispensary where the final product is being sold. For example, using the blockchain shared ledger 405, the stablecoin blockchain system 100 may be able to track and connect a detailed chemical analysis at a laboratory to the final product and therefore to the final customer and/or dispensary where the final product is being sold.

This type of product tracking is currently unavailable in any form. Currently, when there is a product recall, for example, on a medical product, only a lot number with possible sales locations and/or sales stores may be known for that product recall. There is a very limited ability to track the product recall on the medical product in the current environment. However, while utilizing the stablecoin blockchain system 100 and the blockchain shared ledger 405, the product recalls can be tracked down to the individual customer level. The stablecoin blockchain system 100 and the blockchain shared ledger 405 can provide product recall information and communication down to customer-level tracking.

SYSTEM ARCHITECTURE. As will be appreciated by one of skill in the art upon reading the following disclosure, various aspects described herein may be embodied as a method, a computer system, or a computer program product, and specifically the stablecoin blockchain system 100 and the stablecoin blockchain framework 110. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 9A:
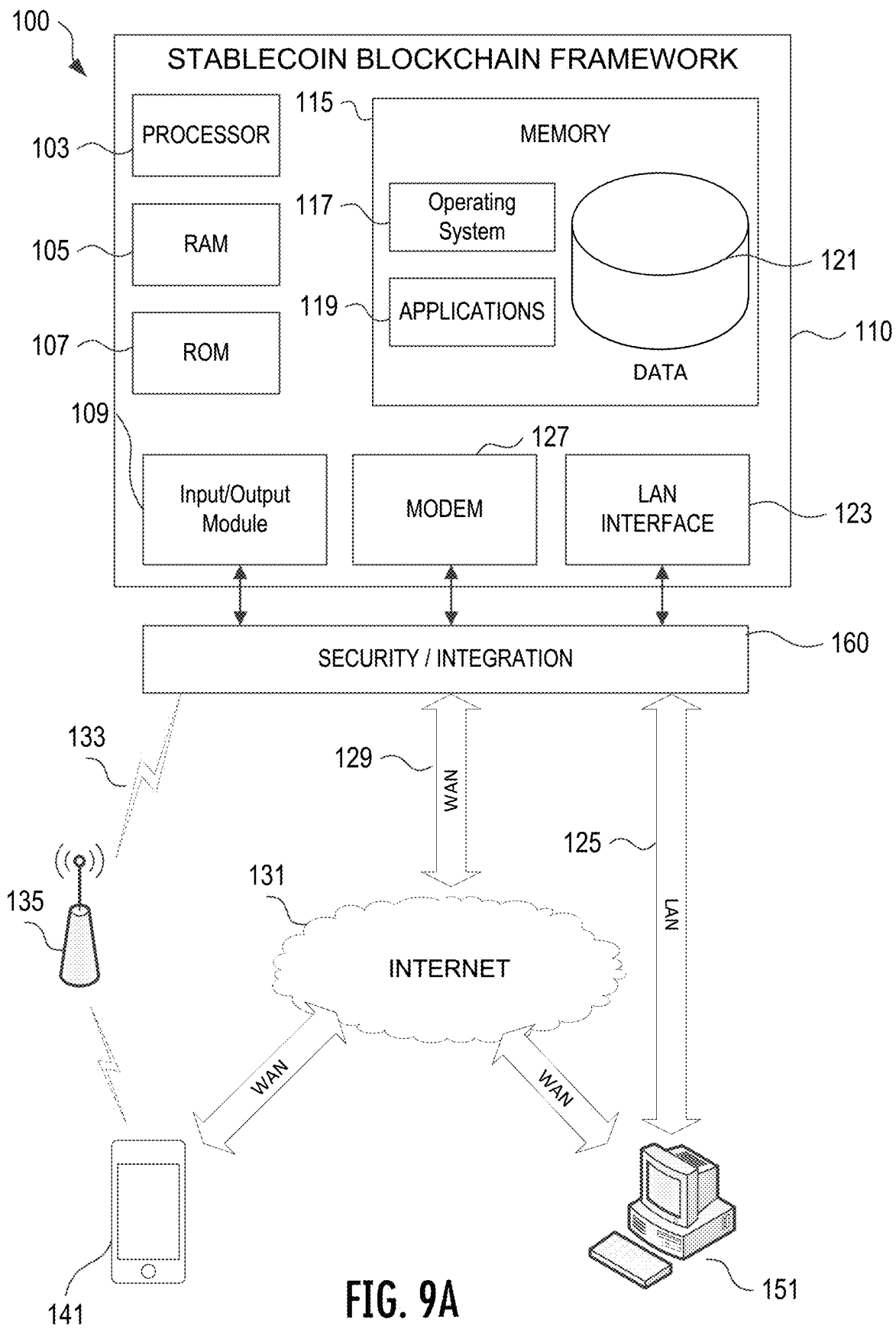
FIG. 9A illustrates a block diagram of the stablecoin blockchain framework in the stablecoin blockchain system that may be used according to one or more illustrative embodiments of the disclosure.

FIG. 9A illustrates a block diagram of the stablecoin blockchain framework 110 in the stablecoin blockchain system 100 that may be used according to one or more illustrative embodiments of the disclosure. The stablecoin blockchain system 100 and the stablecoin blockchain framework 110 may be a specially configured computing device and may have one or more processors 103 for controlling overall operation of the stablecoin blockchain system 100 and its associated components, including one or more memory units (e.g., RAM 105, ROM 107), an input/output module 109, and a memory 115.

The input/output (I/O) 109 may include one or more user interfaces, such as a camera, microphone, keypad, touch screen, and/or stylus through which a user of the stablecoin blockchain system 100 and the stablecoin blockchain framework 110 may provide input, and may also include one or more of a speaker for providing audio output and a video display device for providing textual, audiovisual and/or graphical output. Software may be stored within memory 115 and/or storage to provide instructions to processor 103 for enabling stablecoin blockchain system 100 and the stablecoin blockchain framework 110 to perform various actions. For example, memory 115 may store software used by the stablecoin blockchain system 100 and the stablecoin blockchain framework 110, such as an operating system 117, application programs 119, and associated databases 121. The application program 119 may be utilized by consumers to perform stablecoin transactions as detailed above. The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the stablecoin blockchain system 100 and the stablecoin blockchain framework 110 to execute a series of computer-readable instructions, for example, for a stablecoin blockchain-based, transaction framework 110 designed to facilitate, to increase the transparency of, and to case regulatory verification/oversight of, transactions within highly-regulated industries, such as the legal *Cannabis* industry.

The stablecoin blockchain system 100 and the stablecoin blockchain framework 110 (e.g., a user device, retailer device/server, processor device/server, and one or more server computers, etc.) may operate in a networked environment (e.g., the stablecoin blockchain system 100) supporting connections to one or more remote computers, such as terminals 141 and 151. The terminals 141 and 151 may be personal computers, servers (e.g., web servers, database servers), clients, or mobile communication devices (e.g., mobile phones, portable computing devices, and the like), and may include some or all of the elements described above with respect to the stablecoin blockchain system 100 and the stablecoin blockchain framework 110. In some cases, the terminals 141, 151 may be located at one or more different geographic locations, including, but not limited to, at a site associated with an insurance agent and/or agency and/or a site associated with an insurance provider. The network connections depicted in FIG. 9A include a local area network (LAN) 125 and a wide area network (WAN) 129, and a wireless telecommunications network 133, but may also include other networks. When used in a LAN networking environment, the stablecoin blockchain system 100 and the stablecoin blockchain framework 110 may be connected to the LAN 125 through a network interface or adapter 123. When used in a WAN networking environment, the stablecoin blockchain system 100 and the stablecoin blockchain framework 110 may include a modem 127 or other means for establishing communications over the WAN 129, such as network 131 (e.g., the Internet, a cellular network, and the like). When used in a wireless telecommunications network 133, the stablecoin blockchain system 100 and the stablecoin blockchain framework 110 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless telecommunications network 133.

Also illustrated in FIG. 9A is a security and integration layer 160, through which communications may be sent and managed between the stablecoin blockchain system 100 and the stablecoin blockchain framework 110 and the remote devices (terminals 141 and 151) and remote networks (networks 125, 129, and 133). The security and integration layer 160 may comprise one or more computing devices, such as web servers, authentication servers, and various networking components (e.g., firewalls, routers, gateways, load balancers, etc.), having some or all of the elements described above with respect to the stablecoin blockchain system 100 and the stablecoin blockchain framework 110. As an example, security and integration layer 160 may comprise a set of web application servers configured to use secure protocols and to insulate the stablecoin blockchain system 100 and the stablecoin blockchain framework 110 (e.g., one or more servers, a workstation, etc.) from external devices (e.g., terminals 141 and 151). In some cases, the security and integration layer 160 may correspond to a set of dedicated hardware and/or software operating at the same physical location and under the control of same entities as the stablecoin blockchain system 100 and the stablecoin blockchain framework 110. For example, the integration layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from the stablecoin blockchain system 100 and the stablecoin blockchain framework 110 may include secure and sensitive data, such as customer, retailer, processor, financial, etc. data. Therefore, it may be desirable to protect the data transmission by using secure network protocols and encryption, and also to protect the integrity of the data stored when on the stablecoin blockchain system 100 and the stablecoin blockchain framework 110 using the security and integration layer 160 to authenticate users and restrict access to unknown or unauthorized users. In various implementations, security and integration layer 160 may provide, for example, a file-based integration scheme or a service-based integration scheme. In a filed-based integration scheme, data files may be transmitted to and from the stablecoin blockchain system 100 and the stablecoin blockchain framework 110 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented between the stablecoin blockchain system 100 and the stablecoin blockchain framework 110 and/or security and integration layer 160. The web services may be accessed by authorized external devices and users to support input, extraction, and manipulation of the data in the stablecoin blockchain system 100 and the stablecoin blockchain framework 110. Web services built to support to the stablecoin blockchain system 100 may be cross-domain and/or cross-platform, and may be built for enterprise use. Such web services may be developed in accordance with various web service standards, such as the Web Service Interoperability (WS-I) guidelines. In some examples, system web services may be implemented in the security and integration layer 160 using the Secure Sockets Layer (SSL) or Transport Layer Security (TLS) protocol to provide secure connections between the stablecoin blockchain system 100 and the stablecoin blockchain framework 110 and various clients (e.g., terminals 141 and 151) attempting to access, insert and/or manipulate data within the stablecoin blockchain system 100. SSL or TLS may use HTTP or HTTPS to provide authentication and/or confidentiality. In some cases, system web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 9A, various elements within the memory 115 or other components in the stablecoin blockchain system 100, may include one or more caches, for example, CPU caches used by the processing unit (e.g., the processor 103), page caches used by the operating system 117, disk caches of a hard drive, and/or database caches used to cache content from the database 121. For embodiments including a CPU cache, the CPU cache may be used by one or more processors in the processing unit (e.g., the processor 103) to reduce memory latency and access time. In such examples, a processor 103 may retrieve data from or write data to the CPU cache rather than reading/writing to memory 115, which may improve the speed of these operations. In some examples, a database cache may be created in which certain data from the database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the stablecoin blockchain system 100 and the stablecoin blockchain framework 110.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119, such as a stablecoin transaction application, may be used by the stablecoin blockchain system 100 and the stablecoin blockchain framework 110, including computer executable instructions for a stablecoin blockchain-based, transaction framework 110 designed to facilitate, to increase the transparency of, and to ease regulatory verification/oversight of, transactions within highly-regulated industries, such as the legal *Cannabis* industry.

Aspects of the disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 9B:
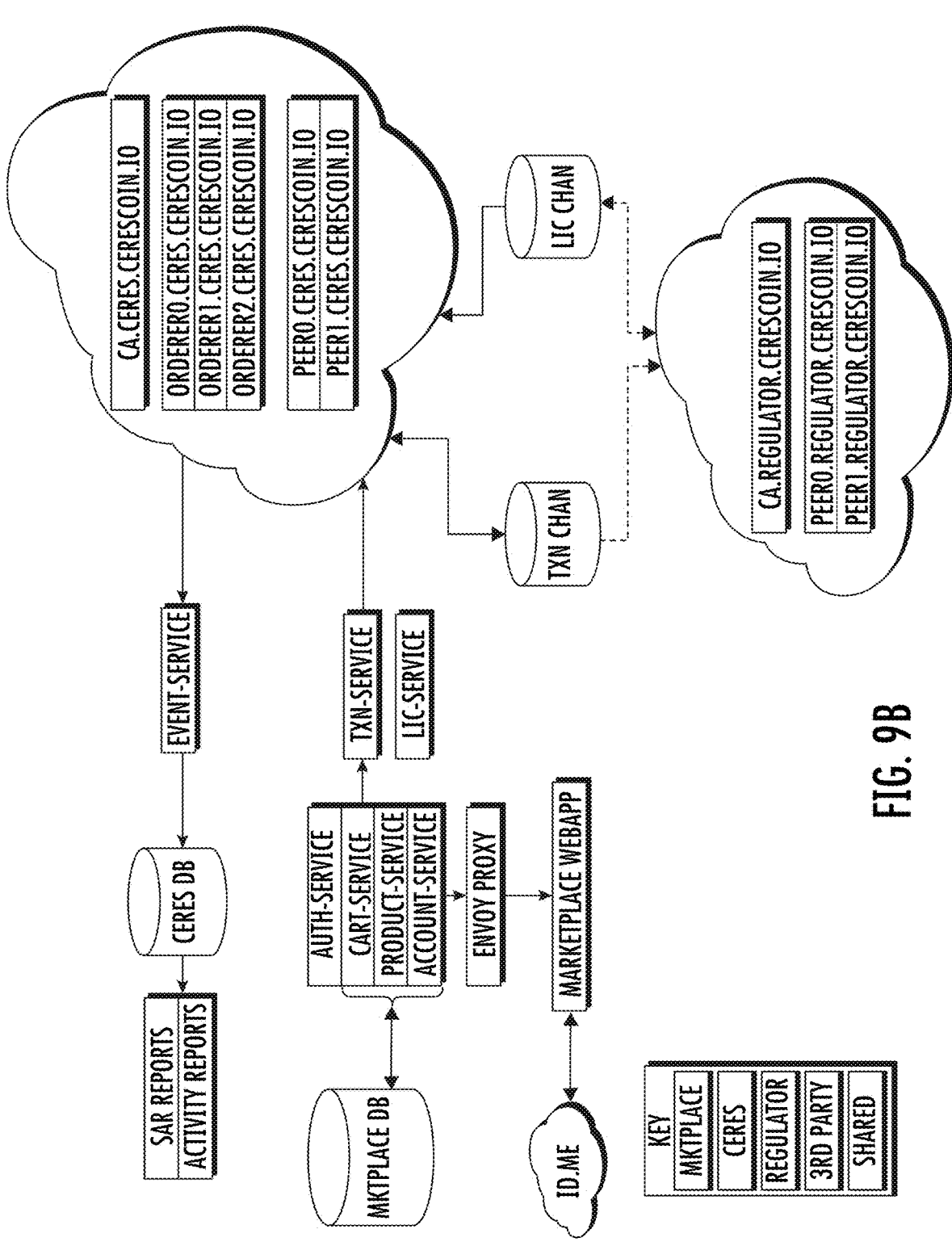
FIG. 9B illustrates an embodiment of an exemplary system architecture for the stablecoin blockchain system and a stablecoin according to one or more aspects described herein.

FIG. 9B illustrates an embodiment of an exemplary system architecture for the stablecoin blockchain system 100 and a security-backed stablecoin 120. As illustrated in FIG. 9B, the system architecture includes many various components, to include the marketplace 910, In another embodiment of this invention, the stablecoin blockchain system 100 may include machine-learning algorithms and/or artificial intelligence for various activities and actions. For example, the stablecoin blockchain system 100 may utilize machine-learning algorithms for: verification, determination, analyzing, selecting, etc. The stablecoin blockchain system 100 may use or employ one or more algorithms. A person having ordinary skill in the art after review of the entirety disclosed herein will appreciate that numerous deterministic, algorithmic, formulaic and/or sto-
chastic approaches are contemplated by the reference to
"algorithm" herein. In addition, machine learning, predic-
tion, and/or statistical clustering methods may also be
employed by the algorithm in some embodiments.

Eligible Purchasers (Stablecoins)—The stablecoins 120
may only be made available to persons who: (i) are eligible
to purchase securities pursuant to the terms of Regulation A;
(ii) who have satisfied all applicable Required Verifications;
and (iii) have established both a Framework Account and a
Coin Account.

Plan of Distribution (Stablecoins)—Upon qualification
the stablecoins 120 may be made available, and sold,
directly by the stablecoin blockchain system 100, solely via
the stablecoin blockchain framework 110, and will not be
listed with, or otherwise available for purchase or trade on,
any trading platform or exchange. However, it is intended
that the stablecoins may be fully transferrable by and among
persons within the stablecoin blockchain framework 110.

Form of Stablecoin—Each stablecoin 120 may be issued,
and all times held, in digital form only. Accordingly, each
purchaser of a stablecoin 120 may be required, as a condi-
tion precedent to acquiring a stablecoin(s) 120, to establish
a Coin Account to hold and manage such purchaser's
stablecoin(s) 120.

Procedures for purchasing stablecoins 120 and rejection
by stablecoin blockchain system 100: In order to subscribe
to purchase a stablecoin, an eligible prospective purchaser
will need to execute and deliver certain sale documents
required by the stablecoin blockchain system 100 from time
to time; including such documents as may be required by the
stablecoin blockchain system 100 to establish the subject
purchaser's state of purchase and/or in connection with any
Required Verifications of the subject purchaser.

In another embodiment of the present invention, the
approved forms of payment for the stablecoin blockchain
system 100 may be the following: a stablecoin purchaser
may pay for their respective stablecoin(s) 120 in U.S.
Dollars ((or other commonly used currencies). Such pay-
ment may be made in cash or by credit/debit card. To pay for
a stablecoin(s) 120 in cash, the respective purchaser will
need to first make a wire/ACH transfer of such funds to their
respective Coin Clearing Account after which such funds
can be used to purchase the subject stablecoin(s) 120. Given
the time consuming, cumbersome, nature of the foregoing
procedure, most stablecoin purchasers may principally pay
for their respective stablecoins 120 using credit/debit cards
and not cash.

While the aspects described herein have been discussed
with respect to specific examples including various modes of
carrying out aspects of the disclosure, those skilled in the art
will appreciate that there are numerous variations and per-
mutations of the above described systems and techniques
that fall within the spirit and scope of the invention. For
example, one of ordinary skill in the art will appreciate that
the steps illustrated in the illustrative figures may be per-
formed in other than the recited order, and that one or more
steps illustrated may be optional in accordance with aspects
of the disclosure. Further, one of ordinary skill in the art will
appreciate that various aspects described with respect to a
particular figure may be combined with one or more other
aspects, in various combinations, without departing from the
invention.

While the preferred embodiments of the invention have
been shown and described, it will be apparent to those
skilled in the art that changes and modifications may be
made therein without departing from the spirit of the inven-
tion, the scope of which is defined by this description.

We claim:

1. A system for providing a blockchain-based network for
supply chain tracking, the system comprising:
    at least one user device and a server for an entity in
        network communication with a blockchain-based plat-
        form, the server comprising a processor and a cache,
        the cache for reducing memory latency and access
        time;
    a blockchain network operating on the blockchain-based
        platform;
    a distributed blockchain ledger operating on the block-
        chain network, wherein the blockchain network posts
        and validates one or more transactions between the
        entity and one or more participants in an ecosystem on
        the distributed blockchain ledger; and
    a Securities Exchange Commission (SEC) registered
        stablecoin used as a medium of exchange for one or
        more transactions between the entity and one or more
        participants with the entity, wherein the one or more
        transactions include transferring the SEC registered
        stablecoin for a product,
    wherein the blockchain network provides supply chain
        tracking based on a financial movement for the one or
        more transactions with the SEC registered stablecoins
        on the distributed blockchain ledger.

2. The system of claim 1, wherein the product is from a
regulated industry and the regulated industry includes one or
more of the following: legal *Cannabis* industry, real estate
industry, tax industry, or liquor distribution industry.

3. The system of claim 1, wherein the one or more
participants in the ecosystem comprises one or more of the
following: producers, processors, consumers, financial
agents, regulatory agents, or tax agents.

4. The system of claim 1, wherein the distributed block-
chain ledger is updated and validated in real-time with each
of the one or more participants in the ecosystem.

5. The system of claim 4, wherein the real-time updating
and validating of the distributed blockchain ledger enables
visibility of where the product is at any point in time, who
owns it, and what condition or state it is in.

6. The system of claim 1, wherein the supply chain
tracking includes a real-time inventory management and
projections of supply and demand of the product.

7. The system of claim 1, wherein the supply chain
tracking provides and elicits one or more trends of con-
sumption through data analytics for the product.

8. The system of claim 1, wherein the blockchain-based
platform tracks a product recall, a chemical analysis, or a
component recall to the product, and therefore to a final
customer and/or a location where the product is being sold.

9. The system of claim 8, wherein the blockchain-based
platform tracks and connects a detailed chemical analysis at
a laboratory to the product and therefore to the final cus-
tomer and/or the location where the product is being sold.

10. A system for providing a blockchain-based network
for supply chain tracking, the system comprising:
    at least one user device and a server for an entity in
        network communication with a blockchain-based plat-
        form, the server comprising a processor and a cache,
        the cache for reducing memory latency and access
        time;
    a blockchain network operating on the blockchain-based
        platform;
    a distributed blockchain ledger operating on the block-
        chain network, wherein the blockchain network posts and validates one or more transactions between the entity and one or more participants in an ecosystem on the distributed blockchain ledger; and a Securities Exchange Commission (SEC) registered stablecoin used as a medium of exchange for the one or more transactions between the entity and the one or more participants, wherein the one or more transactions include transferring the SEC registered stablecoin for a product, wherein the distributed blockchain ledger captures and maintains an immutable record of all transactions of the product utilized with the SEC registered stablecoin, wherein the blockchain network provides supply chain tracking based on a financial movement for the one or more transactions with the SEC registered stablecoins on the distributed blockchain ledger, wherein the supply chain tracking includes one or more product recalls, wherein the product recalls are tracked down to an individual customer level by utilizing the blockchain-based platform and the distributed blockchain ledger.

11. The system of claim 10, wherein the product is from a regulated industry and the regulated industry includes one or more of the following: legal *Cannabis* industry, real estate industry, tax industry, or liquor distribution industry.

12. The system of claim 10, wherein the blockchain-based platform communicates with the ecosystem about the one or more product recalls.

13. The system of claim 10, wherein the distributed blockchain ledger is updated and validated in real-time with each of the one or more participants in the ecosystem.

14. The system of claim 13, wherein the real-time updating and validating of the distributed blockchain ledger enables visibility of where the product is at any point in time, who owns it, and what condition or state it is in.

15. The system of claim 10, wherein the supply chain tracking includes a real-time inventory management and projections of supply and demand of the product.

16. A system for providing a blockchain-based network for supply chain tracking, the system comprising:

at least one user device and a server for an entity in network communication with a blockchain-based platform, the server comprising a processor and a cache, the cache for reducing memory latency and access time;

a blockchain network operating on the blockchain-based platform;

a distributed blockchain ledger operating on the blockchain network, wherein the blockchain network posts and validates one or more transactions between the entity and one or more participants in an ecosystem on the distributed blockchain ledger; and a Securities Exchange Commission (SEC) registered stablecoin used as a medium of exchange for the one or more transactions between the entity and the one or more participants, wherein the one or more transactions include transferring the SEC registered stablecoin for a product and the product is a legal *Cannabis* product purchased from a legal dispensary, wherein the blockchain network provides supply chain tracking based on a financial movement for the one or more transactions with the SEC registered stablecoins on the distributed blockchain ledger, wherein the supply chain tracking includes a chain of custody tracking for all of the transactions with the SEC registered stablecoin from a seed-to-sale supply chain from a dispensary to a final purchase of the legal *Cannabis* product.

17. The system of claim 16, wherein the supply chain tracking includes a real-time inventory management and projections of supply and demand of the legal *Cannabis* product.

18. The system of claim 16, wherein the distributed blockchain ledger captures and maintains an immutable record of all transactions of the legal *Cannabis* product utilized with the SEC registered stablecoin.

19. The system of claim 16, wherein the distributed blockchain ledger is updated and validated in real-time with each of the one or more participants in the ecosystem.

20. The system of claim 19, wherein the real-time updating and validating of the distributed blockchain ledger enables visibility of where the legal *Cannabis* product is at any point in time, who owns it, and what condition or state it is in.

* * * * *